US011958265B2

United States Patent
(12) United States Patent
Wetsch et al.

(10) Patent No.: US 11,958,265 B2
(45) **Date of Patent: *Apr. 16, 2024**

(54) CENTER-FED DUNNAGE SYSTEM FEED AND CUTTER

(71) Applicant: Pregis Innovative Packaging LLC, Chicago, IL (US)

(72) Inventors: Thomas D. Wetsch, Naples, FL (US); Robert Tegel, Huntely, IL (US)

(73) Assignee: Pregis Innovative Packaging LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,181

(22) Filed: Apr. 10, 2023

(65) Prior Publication Data

US 2024/0001637 A1 Jan. 4, 2024

Related U.S. Application Data

(63) Continuation of application No. 17/063,552, filed on Oct. 5, 2020, now Pat. No. 11,623,423, which is a (Continued)

(51) Int. Cl.

*B31D 5/00* (2017.01)
*B65H 16/00* (2006.01)

(Continued)

(52) U.S. Cl.

CPC ......... *B31D 5/0039* (2013.01); *B65H 16/005* (2013.01); *B65H 20/26* (2013.01);

(Continued)

(58) Field of Classification Search

CPC ............................ B31D 5/0047; B31D 5/0052

(Continued)

(56) References Cited

U.S. PATENT DOCUMENTS

| | | | |
|---|---|---|---|
| 2,786,399 | A | 3/1957 | Mason |
| 3,001,735 | A | 9/1961 | Francik |

(Continued)

FOREIGN PATENT DOCUMENTS

| | | | |
|---|---|---|---|
| DE | 19520907 A1 | 1/1996 | |
| EP | 1026113 A2 | 8/2000 | |

(Continued)

*Primary Examiner* — Andrew M Tecco

(74) *Attorney, Agent, or Firm* — Fox Rothschild LLP

(57) ABSTRACT

A dunnage system may include a converting station including a converter configured for pulling in a stream of sheet material and converting the material into dunnage, and an inlet guide having an inlet surface that is coiled such that first and second ends of the inlet surface are discontinuous with each other to define a gap therebetween, the inlet surface configured to channel the sheet material into the converter. A cutter for a dunnage system may include a blade with first and second phases of serrations that are coextensive over at least a portion of the blade, the first phase providing cutting serrations for cutting the dunnage, and the second phase comprising ledges for focusing the cutting and preventing or reducing bunching of the dunnage towards a side of the blade. A method of converting dunnage may also be provided.

14 Claims, 25 Drawing Sheets

Related U.S. Application Data continuation of application No. 15/838,286, filed on Dec. 11, 2017, now Pat. No. 10,792,882, which is a continuation of application No. 13/336,824, filed on Dec. 23, 2011, now Pat. No. 9,840,056.

(60) Provisional application No. 61/426,920, filed on Dec. 23, 2010.

(51) Int. Cl.
*B65H 20/26* (2006.01)
*B65H 35/00* (2006.01)

(52) U.S. Cl.
CPC ... *B65H 35/008* (2013.01); *B31D 2205/0029* (2013.01); *B31D 2205/0047* (2013.01); *B31D 2205/0058* (2013.01); *B65H 2801/63* (2013.01)

(58) Field of Classification Search
USPC .......................................... 493/464, 967, 407
See application file for complete search history.

(56) References Cited

U.S. PATENT DOCUMENTS 3,052,146 A 9/1962 Glendening
3,509,797 A 5/1970 Johnson
3,509,798 A 5/1970 Johnson
3,542,268 A 11/1970 Schramm
3,650,877 A 3/1972 Johnson
3,741,403 A 6/1973 Fleischer, Jr. et al.
4,022,396 A 5/1977 Manchester et al.
4,450,996 A 5/1984 Kamp
4,598,531 A 7/1986 Ruff et al.
4,699,609 A 10/1987 Komaransky et al.
5,078,311 A 1/1992 Taguchi et al.
5,131,903 A 7/1992 Levine et al.
5,188,581 A 2/1993 Baldacci
5,211,620 A 5/1993 Ratzel et al.
5,219,126 A 6/1993 Schutz
5,232,430 A 8/1993 Nitsch
5,301,889 A 4/1994 Ball
5,322,477 A 6/1994 Armington et al.
5,377,570 A 1/1995 Giljam
5,387,173 A 2/1995 Simmons, Jr.
5,439,730 A 8/1995 Kelly et al.
5,474,250 A 12/1995 Birkmann et al.
5,829,231 A 11/1998 Harding et al.
5,864,484 A 1/1999 Harding
6,095,454 A 8/2000 Simmons, Jr. et al.
6,179,765 B1 1/2001 Toth
6,237,449 B1 5/2001 Orlosky
6,378,800 B1 4/2002 Apichom
6,405,913 B1 6/2002 Passamoni
6,524,230 B1 2/2003 Harding et al.
6,632,165 B1 10/2003 Letourneau et al.
6,632,311 B1 10/2003 Glenna et al.
6,673,001 B2 1/2004 Toth
6,695,247 B2 2/2004 Widlund
6,702,212 B2 3/2004 Abba et al.
6,756,096 B2 6/2004 Harding
6,790,302 B2 9/2004 Beck et al.
6,802,467 B2 10/2004 Abba et al.
6,887,329 B2 5/2005 Harding
6,910,997 B1 * 6/2005 Yampolsky ............... B26F 1/22 493/464
6,981,352 B2 1/2006 Chow et al.
7,066,422 B1 6/2006 Slocum
7,083,560 B2 * 8/2006 Kobben ................... B26D 5/14 493/464
7,186,208 B2 3/2007 Demers et al.
7,347,809 B2 3/2008 Toth
7,407,471 B2 8/2008 Demers et al.
7,479,100 B2 1/2009 Toth
7,481,163 B2 1/2009 Theilacker
7,484,341 B2 2/2009 Konno
7,585,268 B2 9/2009 Cheich et al.
7,651,455 B2 * 1/2010 Yampolsky .......... B31D 5/0052 493/464
7,744,519 B2 * 6/2010 Wetsch ................ B31D 5/0052 493/464
7,771,338 B2 * 8/2010 Wetsch ................ B65H 35/008 53/238
8,016,735 B2 * 9/2011 Wetsch ................ B31D 5/0052 493/464
8,554,363 B2 10/2013 Sperry et al.
8,555,761 B2 10/2013 Keily et al.
8,641,591 B2 2/2014 Wetsch et al.
9,254,578 B2 * 2/2016 Wetsch ................ B31D 5/0043
9,321,235 B2 4/2016 Cheich et al.
9,840,056 B2 12/2017 Wetsch et al.
10,093,070 B2 10/2018 Lintala et al.
10,661,523 B2 * 5/2020 Wetsch .................... B26D 5/20
2002/0193224 A1 12/2002 Toth
2003/0073558 A1 4/2003 Chesterson et al.
2003/0092552 A1 * 5/2003 Armington .......... B31D 5/0047 493/464
2004/0014806 A1 1/2004 Bhat et al.
2004/0142806 A1 7/2004 Coppus et al.
2004/0266598 A1 * 12/2004 Toth ..................... B31D 5/0052 493/350
2005/0247220 A1 11/2005 Brandenburg et al.
2007/0117703 A1 5/2007 Cavaliere et al.
2007/0117704 A1 5/2007 Toth
2008/0070773 A1 * 3/2008 Wetsch ................ B31D 5/0052 493/464
2008/0076653 A1 3/2008 Shaw et al.
2008/0098699 A1 5/2008 Cheich et al.
2008/0207421 A1 * 8/2008 Wetsch ................ B65H 35/008 493/464
2008/0261794 A1 10/2008 Slovencik
2009/0023570 A1 1/2009 Kung et al.
2009/0026306 A1 1/2009 Kempster et al.
2009/0231123 A1 9/2009 Rowell et al.
2010/0029456 A1 2/2010 Cheich
2010/0127112 A1 5/2010 Aquarius
2010/0132529 A1 6/2010 Miyazaki
2011/0052875 A1 3/2011 Wetsch et al.
2011/0053750 A1 3/2011 Wetsch et al.
2012/0035038 A1 2/2012 Lembach et al.
2012/0053040 A1 3/2012 Wetsch et al.
2012/0165172 A1 6/2012 Wetsch et al.
2012/0329629 A1 12/2012 Wetsch et al.
2013/0105613 A1 5/2013 Persson
2015/0014205 A1 1/2015 Yap et al.

FOREIGN PATENT DOCUMENTS

FR 2667854 A1 4/1992
FR 2808726 B1 12/2002
GB 2173141 B 2/1988
WO 2009126838 A2 10/2009

* cited by examiner

CENTER-FED DUNNAGE SYSTEM FEED AND CUTTER

CROSS-REFERENCE TO RELATED APPLICATION

This application is a continuation of U.S. patent application Ser. No. 17/063,552, filed Oct. 5, 2020, which is a continuation of U.S. patent application Ser. No. 15/838,286, filed Dec. 11, 2017, now U.S. Pat. No. 10,792,882, which is a continuation of U.S. patent application Ser. No. 13/336,824, filed Dec. 23, 2011, now U.S. Pat. No. 9,840,056, which claims priority to U.S. Provisional Application No. 61/426,920, filed on Dec. 23, 2010, the disclosures of which are incorporated by reference herein in their entirety.

FIELD

A dunnage system for processing material into dunnage is herein described.

BACKGROUND

Products to be transported and/or stored often are packed within a box or other container. In many instances, however, the shape of the product does not match the shape of the container. Most containers utilized for transporting products have the general shape of a square or rectangular box and, of course, products can be any shape or size. To fit a product within a container and to safely transport and/or store the product without damage to the product, the void space within the container is typically filled with a packing or cushioning material.

The protective-packing material utilized to fill void space within a container is often a lightweight, air-filled material that may act as a pillow or cushion to protect the product within the container. Many types of protective packaging have been used. These include, for example, foam products, inflatable pillows, and paper dunnage.

In the context of paper-based protective packaging, rolls of paper sheet are crumpled to produce the dunnage. Most commonly, this type of dunnage is created by running a generally continuous strip of paper into a dunnage conversion machine that converts a compact supply of stock material, such as a roll or stack of paper, into a lower density dunnage material. The continuous strip of crumpled sheet material may be cut into desired lengths to effectively fill void space within a container holding a product. The dunnage material may be produced on an as needed basis for a packer. Examples of cushioning product machines that feed a paper sheet from an innermost location of a roll are described in U.S. Patent Publication Nos. 2008/0076653 and 2008/0261794. Another example of a cushioning product machine is described in U.S. Patent Publication No. 2009/0026306.

SUMMARY

An embodiment of a dunnage system includes a converting station, which includes a converter configured for pulling in a stream of sheet material and converting the material into dunnage. An inlet guide of the embodiment can have an inlet surface that is coiled such that first and second ends of the inlet surface are discontinuous with each other, with one of the ends being disposed closer to the converter. The inlet surface can be configured to channel the sheet material into the converter.

The first and second ends of the inlet surface can define a gap therebetween configured for relieving stress on the pulled stream sheet material. Also, the first and second ends can be overlapped and spaced along the axial direction of the inlet guide. The first and second ends can be substantially straight, or have another suitable configuration, and can define a perceived angle of intersection viewed along the axial direction, which can be, for example, between approximately 75° and 105°.

A embodiment has a supply station configured for receiving a supply roll of the sheet material. In this embodiment, the converter can be configured for drawing the material in a first direction. The inlet guide can be disposed between the converter and the supply station such that the stream exits the supply station in a second direction at an angle to the first direction, for example with the guide configured for redirecting the stream from the second direction to the first direction and defining a bend location between the first and second directions. The gap can be disposed on a portion of the inlet guide sufficiently near the bend location for relieving stress in the sheet material. Also, the gap can be disposed laterally of the bend location relative to both the first and second directions. In one embodiment, the first direction is mostly horizontal, the second direction is mostly vertical; and the gap is disposed on a lower lateral side of the inlet guide.

A supply station is preferably provided and configured for holding a roll of the sheet material. The inlet guide can be configured for guiding the sheet material fed therethrough as a coil to the converter. The inlet surface can be curved from a portion of the surface radially outside the inlet guide to a portion of the surface radially inside the inlet guide for guiding the sheet material into the inlet guide and preventing or reducing catching on the material. The second end can be a free end, and the first end can be connected to a support portion in supportive association with the converting station.

The converter can include a rotating drum configured for pulling and crushing the stream for converting the sheet material. Guide flanges on opposite lateral sides of the drum can be provided for guiding the sheet material onto the drum from the inlet guide. The inlet guide can have an interior diameter that is between about ¾ and 2 times the width of the drum, for example.

A drum guide can be provided having a radially outer edge and extending thereto from adjacent a lateral edge of the drum and being oriented for guiding the sheet material onto the drum from the inlet guide. The lateral position of the drum guide can be outside a respective inner lateral surface of the inlet guide. In an embodiment, at least one of the guide flanges is free to rotate relative to the drum to prevent pulling a foreign object onto the drum and through the converter.

In an embodiment, converter includes a pressing member having an engaged position biased against the drum for engaging and crushing the sheet material passing therebetween against the drum to convert the sheet material. The pressing member can have a released position displaced from the drum to release jams. The converting station can have a magnetic position control system configured for magnetically holding the pressing member in each of the engaged and released positions. The position control system is preferably configured for exerting a greater magnetic force retaining the pressing portion in the engaged position than retaining the pressing member in the released position.

A supply station of the system can be configured for receiving a supply roll of the sheet material. Preferably, the supply station is angularly repositionable relative to the inlet guide in a plurality of feed locations and the inlet guide configured for receiving and channeling the sheet material from the plurality of feed locations. The supply station can be configured for holding a plurality of supply rolls, each supply roll being positioned in one of the plurality of feed locations. In an embodiment, the feed locations for adjacent supply rolls of the plurality of supply rolls are at least 40° apart.

Supply units of the sheet, feed stock can be daisy-chained together, with the end of one supply unit is attached to the beginning of the next supply unit, so that the end of the one supply unit pulls the beginning of the next supply unit into the converter. The supply units can be supply rolls.

A cutter can be provided downstream of the converting station, and can include a blade with first and second phases of serrations that are coextensive over at least a portion of the blade. The first phase can have cutting serrations configured for cutting the dunnage, and the second phase comprising ledges for focusing the cutting and preventing or reducing bunching of the dunnage towards a side of the blade. The first phase of serrations is preferably substantially smaller than the second phase of serrations, and the blade preferably comprises first and second blade portions disposed in a V-shape with respect to each other.

In an embodiment of method of converting dunnage, a stream of coiled sheet material is pulled through an inlet guide, which has an inlet surface that is coiled such that first and second ends of the inlet surface are discontinuous with each other to define a gap therebetween, to channel the sheet material into a converter. The material is converted into dunnage in the converter.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

DETAILED DESCRIPTION

The dunnage system provided herein may be used to process sheet material, such as a roll of paper, into dunnage. Commonly, the unprocessed material type may be pulp-based virgin and recycled papers, newsprint, cellulose and starch compositions, and poly or synthetic material, of suitable thickness, weight, and dimensions.

The particular system described may be a center-fed system that pulls paper from the center of a roll of paper creating a coiled stream of dunnage. The system may then receive the coiled stream into a converting station where it may be pressed, squeezed, bunched, or otherwise converted into a stream of dunnage. The stream of dunnage may then exit the converting station and portions of dunnage suitable for use in packing operations may be parted from the stream of dunnage. The portions may be parted by tearing, cutting, or otherwise separating them from the stream of dunnage. In some embodiments, a parting device may be provided to assist in parting the portions from the stream of dunnage.

Figure 1:
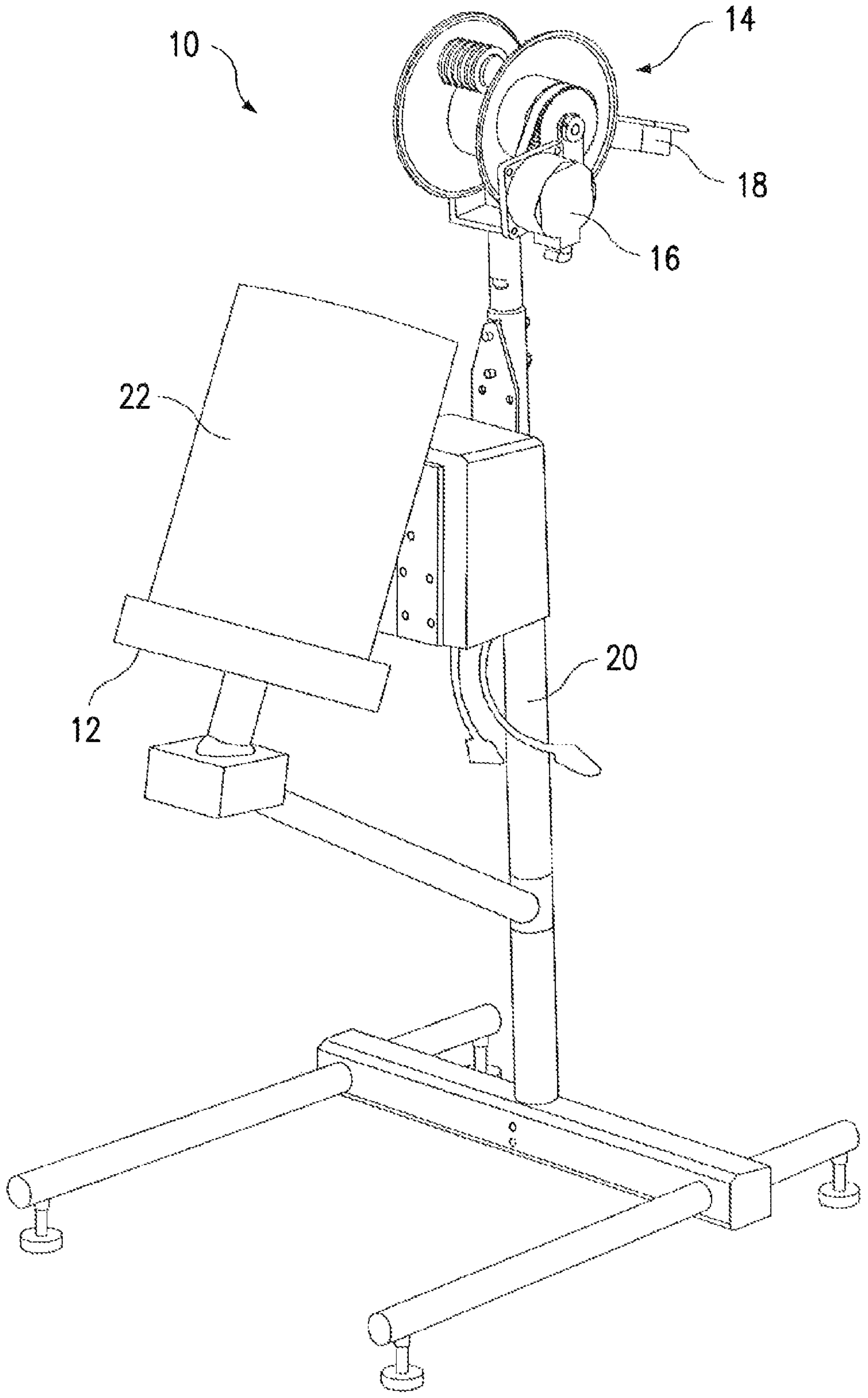
FIG. 1 is a perspective view of a dunnage system in accordance with one embodiment.
Figure 3:
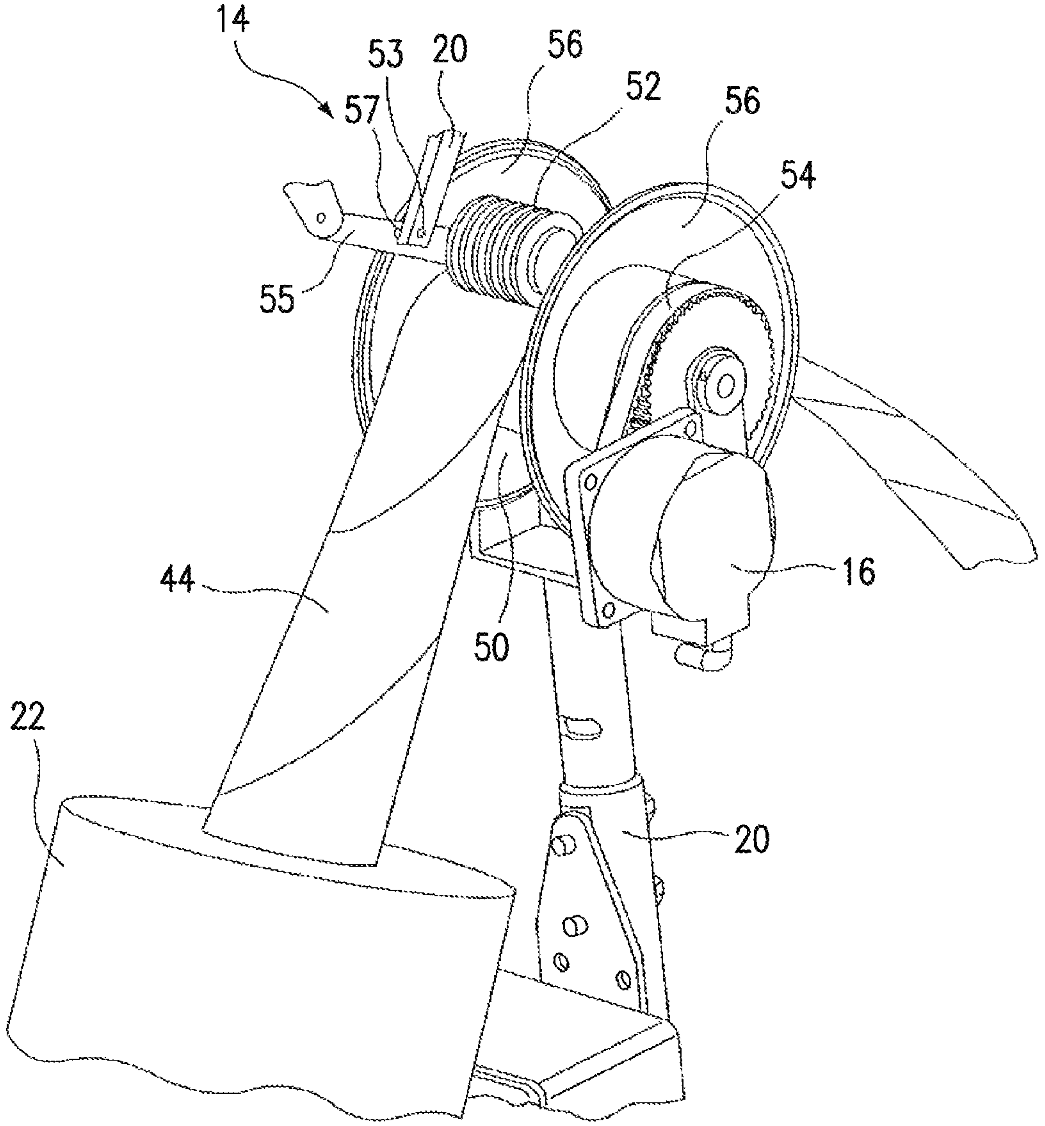
FIG. 3 illustrates a close up view of the converting station thereof.

FIG. 1 illustrates a dunnage system 10 in accordance with one embodiment. As shown, the dunnage system 10 may include a supply station with a supply support 12, a converting station 14, including a driving mechanism such as a motor 16, and a parting device such as a cutter 18. The supply support 12 and the converting station 14 are provided on a frame 20. Generally, the frame 20 may be formed of steel, aluminum, another metal, a composite, or any other suitable material. In some embodiments, the parting device or cutter 18 may also be provided on the frame 20. A sheet supply 22 is shown positioned on the supply support 12. The supply support 12, the sheet supply 22, and the converting station 14 are oriented with respect to each other such that sheet material is drawn generally upwardly from the sheet supply 22 to the converting station 14. Alternative orientations may also be employed. In other embodiments, for example, sheet material may be drawn generally laterally or downwardly from the supply station to the converting station 14. Further, in the embodiment of FIG. 1, the created dunnage is generally directed through the converting station 14, and downwardly and forwardly to the parting device or cutter 18, as shown in FIG. 3. In other embodiments, the created dunnage may exit the device in other directions.

Figure 2:
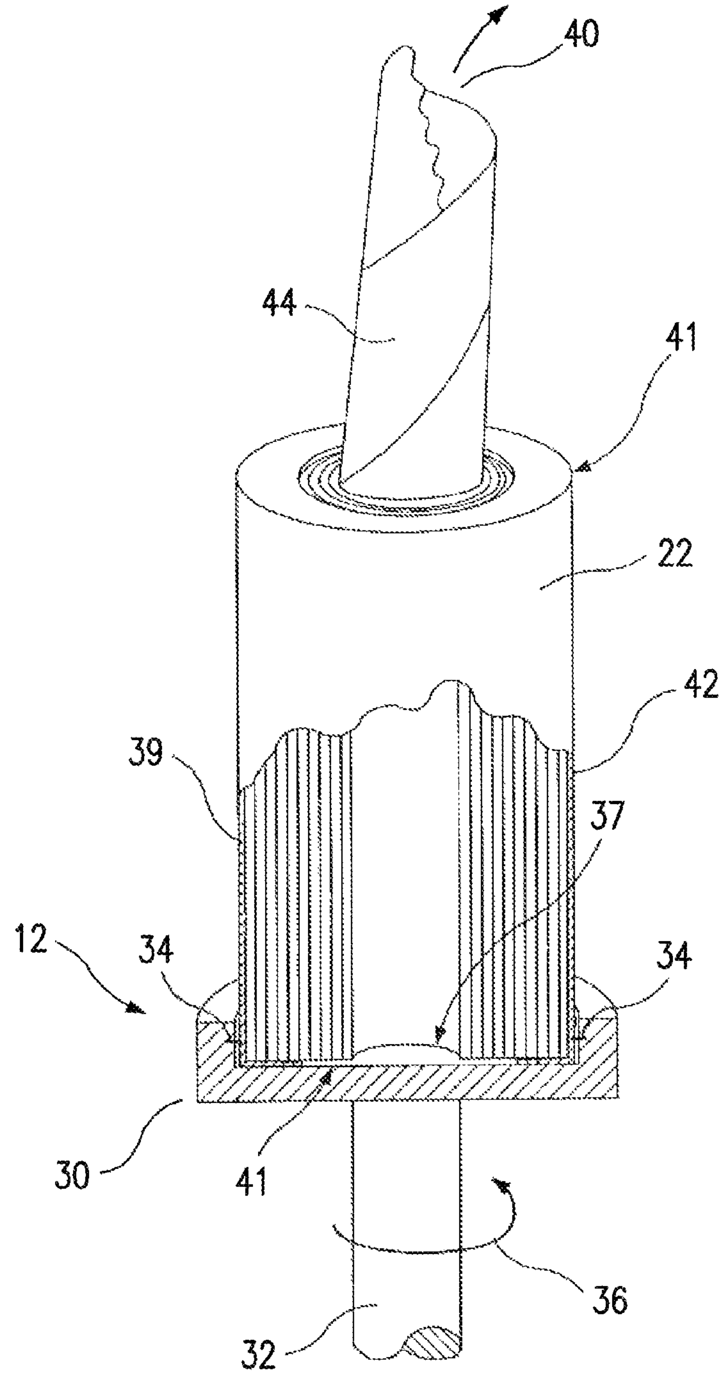
FIG. 2 illustrates a close up view of the supply support thereof.

Referring to FIG. 2, the preferred embodiment of support 12 includes a roll base 30, supported on support structure 32, and a gripping member 34. A supply roll 22 of sheet material can rest on the base 30. Specifically, the roll base 30 may include a roll-receiving space 37 in which the supply roll 22 may be accommodated. The support structure 32 in this embodiment is configured to allow the supply roll 22 to rotate axially. This can be accomplished by allowing the supply roll 22 to rotate with respect to the base 30, or by allowing the base 30 and/or its support structure 32 to rotate as indicated by arrow 36. Preferably, free rotation of the supply roll 22 is allowed, and such rotation can optionally be regulated such as by providing a brake or other mechanism to provide a resistance to the rotation, such as a frictional element. In another embodiment, the rotation may be driven, such as by a motor. In yet another embodiment, however, the roll base or other support for the supply roll 22 is non-rotatable and can be in a fixed position, such as to hold the supply roll in a fixed position, with respect to the converting station 14.

One or more gripping members 34 can be provided to positively hold the supply roll 22 to the base 30. In one embodiment, the gripping members 34 comprise barbs, for example that are directed towards the roll to grip the outer surface thereof, so that the supply roll 22 can be held as the sheet material is depleted therefrom. Alternative gripping members include high-friction or traction surfaces, for instance. In one embodiment, the supply roll 22 is provided on the base 30 in a naked or unwrapped state. In a more preferred embodiment, the supply roll 22 is provided with an outer wrapping, such as a plastic shrink-wrap 39 or other packaging extending around the roll 22, and preferably closely fitting about the roll, containing the roll, keeping it wound, and facilitating transportation thereof. The shrink wrap 39 can have an opening 41 on an axial end to allow the sheeting material, such as paper, from the supply roll 22 to be removed from the center thereof. A second opening 41 can be provided at the opposite axial end of the supply roll 22 so that the roll can be positioned with either end facing the converting station 14.

The preferred barbs 34 in this embodiment extend inwardly towards the roll-receiving space 37 in the base 30 in which the supply roll is received, and can be flexible to automatically engage the supply roll 22 and grip it onto the base 30 when the supply roll 22 is placed on the base 30 or inserted into the roll-receiving space 37. The barbs can be sharp to at least partially penetrate the outer surface of the supply roll 22. The angle and flexibility of the barbs can be selected to facilitate this capture of the supply roll 22 and its retention. Preferably, the barbs are configured to capture and retain the shrink wrap 39 or other packaging, while allowing the paper of the supply roll 22, including outermost paper layer on the supply roll 22, to be pulled out therefrom, such as linearly, by the converting station 14. After the paper from the supply roll 22 is emptied, the empty shrink wrap 39 can easily be removed from the barbs 34 and the base 30. Alternative embodiments can have barbs or other gripping members 34 that are selectively engageable and disengageable, and/or that can grip one or more paper layers on the supply roll 22 itself.

Figure 4:
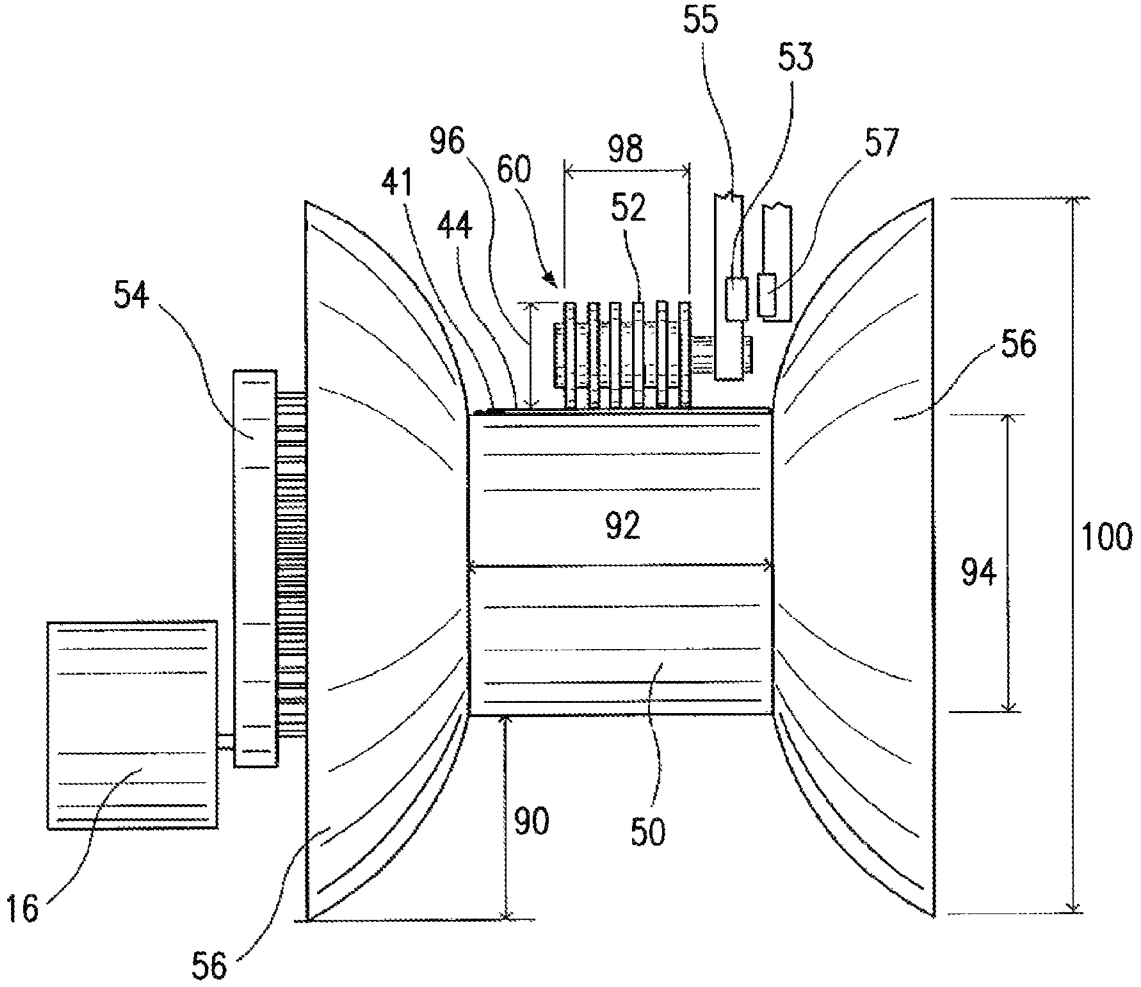
FIG. 4 is a front view of the converting station thereof.

Referring to FIGS. 2-4, sheet material from the supply roll 22, standing on its end in the base 30, may be drawn from inside the supply roll 22. A first end 40, drawn from a radially innermost location in the roll 22, may be pulled from the roll 22 and introduced into the converting station 14. A second end 42 at a radially outermost location, may be held in place by the shrink wrap 39. As the paper is withdrawn from the innermost location from roll 22, it twists about a longitudinal axis as a helix, forming a tube or coil 44, such as with the lateral edges of the sheet material meeting or overlapping in the coil.

The converting station 14, shown particularly in FIGS. 3 and 4, may include a drum 50 that is driven to draw the coil 44 through the converting station 14. Preferably, a roller 52, which can be a smaller drum, is provided cooperating with, and preferably positioned and biased against, the drum 50 allowing the drum to grip the coil 44 and pull it along a feed path through the converting station 14. The size, position, biasing force, and motion of the roller 52 in relation to the drum 50 can be selected such that the small roller 52 creases the sheet material of the coil 44 as it bunches up ahead of the location where it is pinched between the roller 52 and drum 50, or laterally on the sides thereof. This creasing can help retain the flattened shape of the produced dunnage material. Alternative embodiments may not employ such creasing.

During the pulling of the coil 44 between the drum 50 and roller 52, the converting station 14 may define an infeed, an outfeed, and a feed path generally extending from the infeed to the outfeed. The drum 50 and roller 52 together help define the feed path. The drum 50 and roller 52 are preferably configured and associated with each other to also flatten the coil to provide a flattened tube of paper dunnage-material at the output side of the device. When removed from the system 10, such flattened tube can be rolled over itself, such as about an axis generally parallel to the tube's lateral axis, and coiled to provide 3-dimensional dunnage to fill voids in a package to provide protective packaging for an item that is to be shipped within a box or other container.

The large drum 50 can be driven, for example, by motor 16 or another motive device. In alternative embodiments, the roller 52 is driven in addition to or instead of the drum 50. In the preferred embodiment, the roller 52 is not powered and is free to roll. Rotation of the roller 52 in this embodiment may be due to its engagement against the drum 50. In the embodiment shown, the motor 16 drives the large drum 50 using belt 54.

The roller 52 can be associated with the large drum in any suitable manner including being biased thereagainst by gravity or a spring. In the preferred embodiment, the roller 52 is held in place against the drum 50 by a magnetic retaining mechanism. The magnetic retaining mechanism can include, for example, a first magnetic member 53 mounted with the roller and a second magnetic member 57 mounted to the frame 20. The first magnetic member 53 may include, for example, a magnet or ferrous member mounted to a support arm that pivots or otherwise moves to place the roller 52 against the drum 50 and allow it to be pushed away therefrom. The first magnetic member 53 may be magnetically coupled, such as by magnetic attraction, to the second magnetic member 57 sufficiently to require a predetermined force tending to separate the roller 52 from the drum 50 to overcome the magnetic coupling. Forces tending to separate the rollers may occur, for example, if a paper jam occurs between the roller 52 and the drum 50. Once the magnetic coupling is overcome, the bias of the roller 52 towards the drum 50 may be decreased or eliminated due to the proximity between the magnets decreasing. As such, removal of the jam or simply opening the device for servicing may be facilitated.

The diameter 94 of the drum 50 is preferably greater than the diameter 96 of the roller 52. In some embodiments, the axial width 92 of the drum 50 is greater than the width 98 of the roller 52. Preferably the roller 52 width is between ¼, ⅓, or ½ and about the width 92 of the drum 50, although smaller or larger sizes can be used. In some embodiments, the roller 52 may have an approximately 2 inch diameter 96 and an approximately 2 inch width 98. In some embodiments, the drum 50 may have an approximately 4-5 inch diameter 94 and an approximately 4 inch width 92. Spaces 60 can be provided on opposite sides of the roller 52 to accommodate the lateral edges of the coil 44 being pulled through the converting station 14. The drum 50 and/or the roller 52 may be provided with a smooth outer surface or other textures or shapes depending on the material to be gripped, and can have ridges, as shown for the roller 52.

The large drum 50 is preferably provided with one or two guides 56 on each axial side of the drum 50 for guiding the sheet material towards the center of the drum 50. The guides 56 can be rotationally fixed to the drum 50, and can extend therefrom as flanges, and preferably rotate with the drum 50. In other embodiments, one or more of the guides 56 may be free to rotate relative to the drum 50. In some embodiments, the guides 56 can have dished sides, such as convex when viewed from the surface of the drum 50 that engages the coil 44 in the converting station 14. In some embodiments, the guides 56 may have a bowl structure. In other embodiments, the guides 56 can have other shapes, such as having a conical structure or being primarily planar flanges, optionally with bent or curved outer edges. Generally, walls of the guides 56 may be provided at an angle to the drum 50 such that the guides 56 extend from the drum at more than 90° but less than 180° from the drum 50. In some embodiments, the angle of the guide 56 starts at the drum 50. In other embodiments, the guides 56 include a planar, or straight-sided conical portion extending from the drum, and preferably transitioning into a shallower angle or a curved surface. The radial height 90 of the guides 56 above the drum surface is preferably between about 1/10 of the width 92 of the drum 50 to about ½, one time, or twice the width 92 of the drum 50, and the diameter 100 of the guides 56 are preferably between 1/10 and 3 times the diameter 94 of the drum, and preferably about 1.5 to 2.5 times the diameter 94. The guides are preferably generally axially symmetrical to continue to guide and direct the coiled tube 44 onto the drum 50 as the drum rotates. Preferably, the guides 56 are at least a third of, more preferably at least a half of, and most preferably taller than the roller 52.

The drums may be formed of any suitable material. In some embodiments, the drums may be provided in a combination of selective surfaces ranging from hard to soft and smooth to rough. In some embodiments, the drums comprise a medium to hard durometer elastomeric and metallic and/or plastic mating drums.

Figure 5:
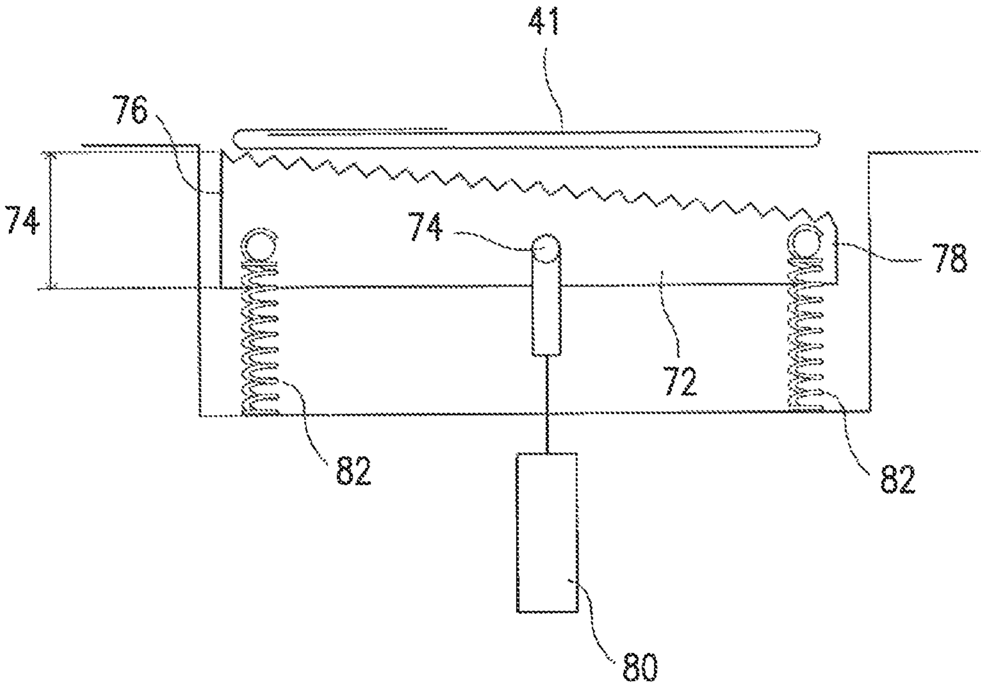
FIG. 5 illustrates a front view of the cutter of a dunnage system in accordance with one embodiment.

FIG. 5 illustrates a close up view of one embodiment of a parting device or cutter 18. In this embodiment, the parting device 18 is in the form of a cutting station 70. The preferred cutting station 70 includes a cutter for cutting the formed dunnage to a desired length of coil. In one embodiment, the cutter includes a blade 72, although other suitable cutting, tearing, or other severing or parting devices can be used to part the length of dunnage from the rest of the coiled tube 44. The blade 72 of the embodiment shown is serrated and is mounted to pivot or otherwise swivel, such as about pivot 73 as it cuts through the tube 44 of formed dunnage downstream from the converting station 14. One or more spring elements 82 can be used to preposition the blade in a desired orientation in which it will make initial contact with the tube 44, yet allow the blade to pivot as it cuts through the tube 44.

Preferably, one side 76 has a height 74 that is higher than a height of the other side 78 to start contacting the tube 44 on one side thereof. The blade 72 is biased as it cuts by the tube 44 to cause the blade to rotate around its pivot 73, and this rotation of the blade can assist in cutting through the tube as it adds a rotational and/or a horizontal (generally parallel to the flat sides of the tube 44) component of motion of the blade. This motion can decrease the force to cut through the tube 44 and can provide a sliding contact between the serrations and tube 44 due to the rotation and/or horizontal movement.

The blade 72 can be operably coupled to an actuator 80 to push the blade against and through the tube 44, although in other embodiments, the tube 44 may be pulled against the blade 72 by its end, or the side of the tube 44 can be pushed thereagainst by another member disposed on an opposite side of the tube 44 from the blade 72. The actuator 80 can act, for example, directly on the pivot 73, and can include a motor, a linear actuator, or another suitable powered device. Alternatively, the blade 72 may be operated manually. Springs 82 return the blade 72 to its original position. Some embodiments do not include a cutting mechanism.

Figure 6:
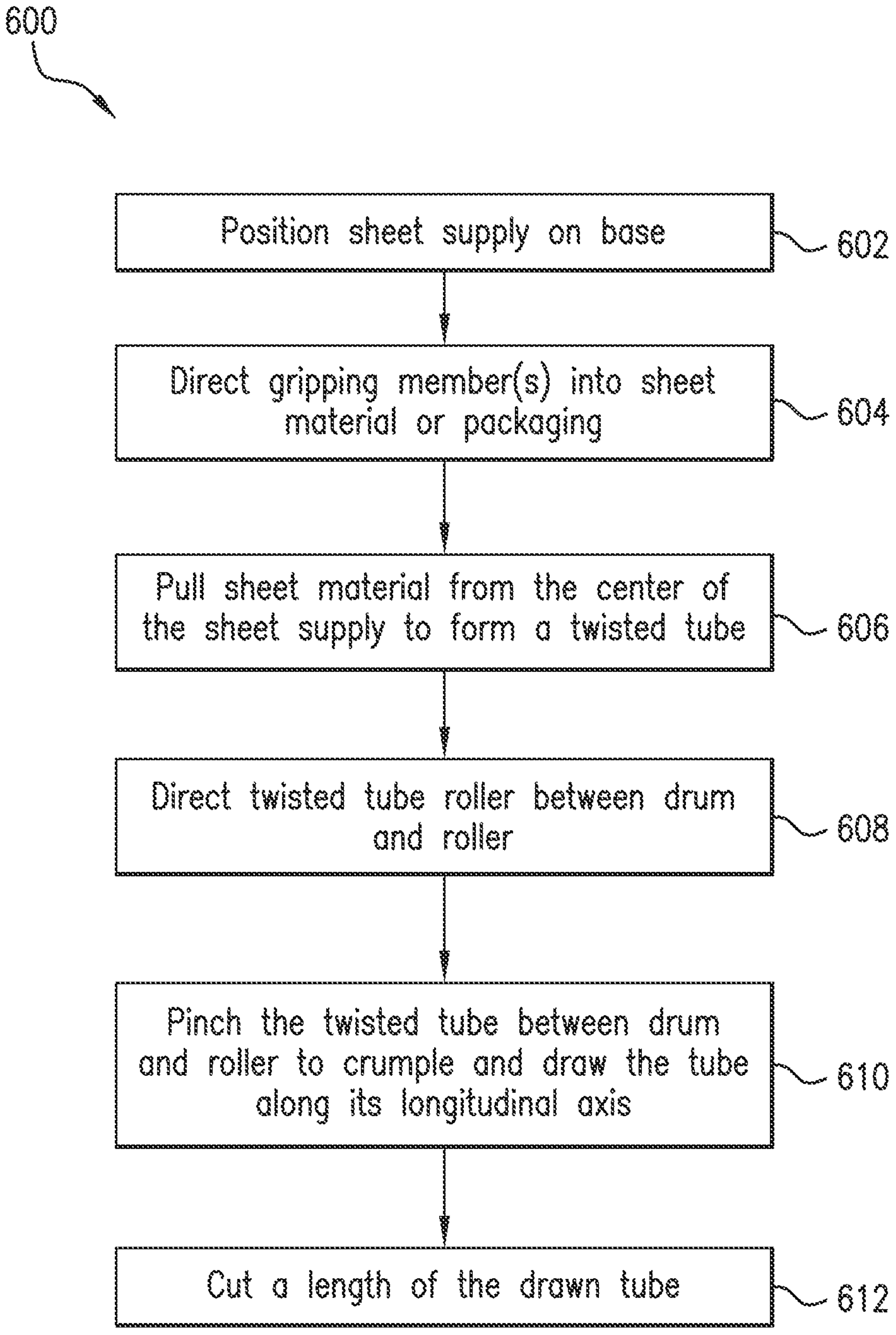
FIG. 6 illustrates a method of forming dunnage in accordance with one embodiment.
Figure 7:
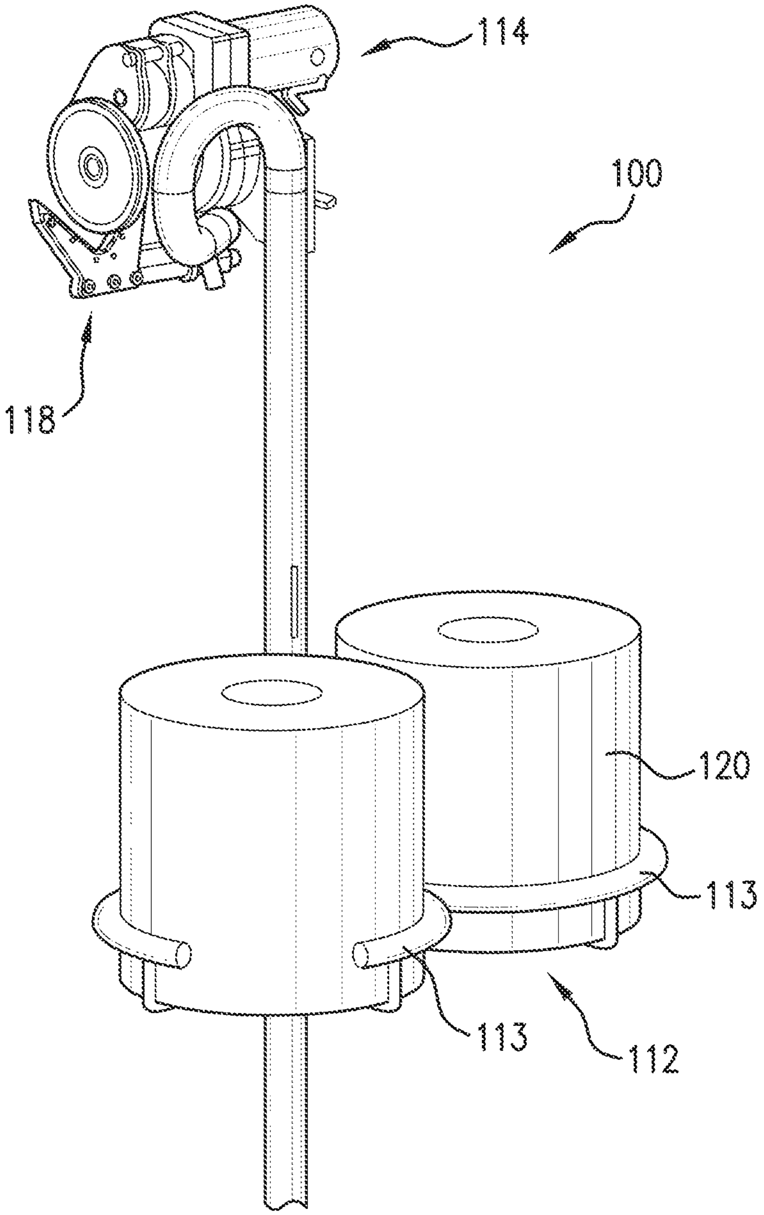
FIG. 7 is a rear perspective view of a dunnage system in accordance with another embodiment.
Figure 8:
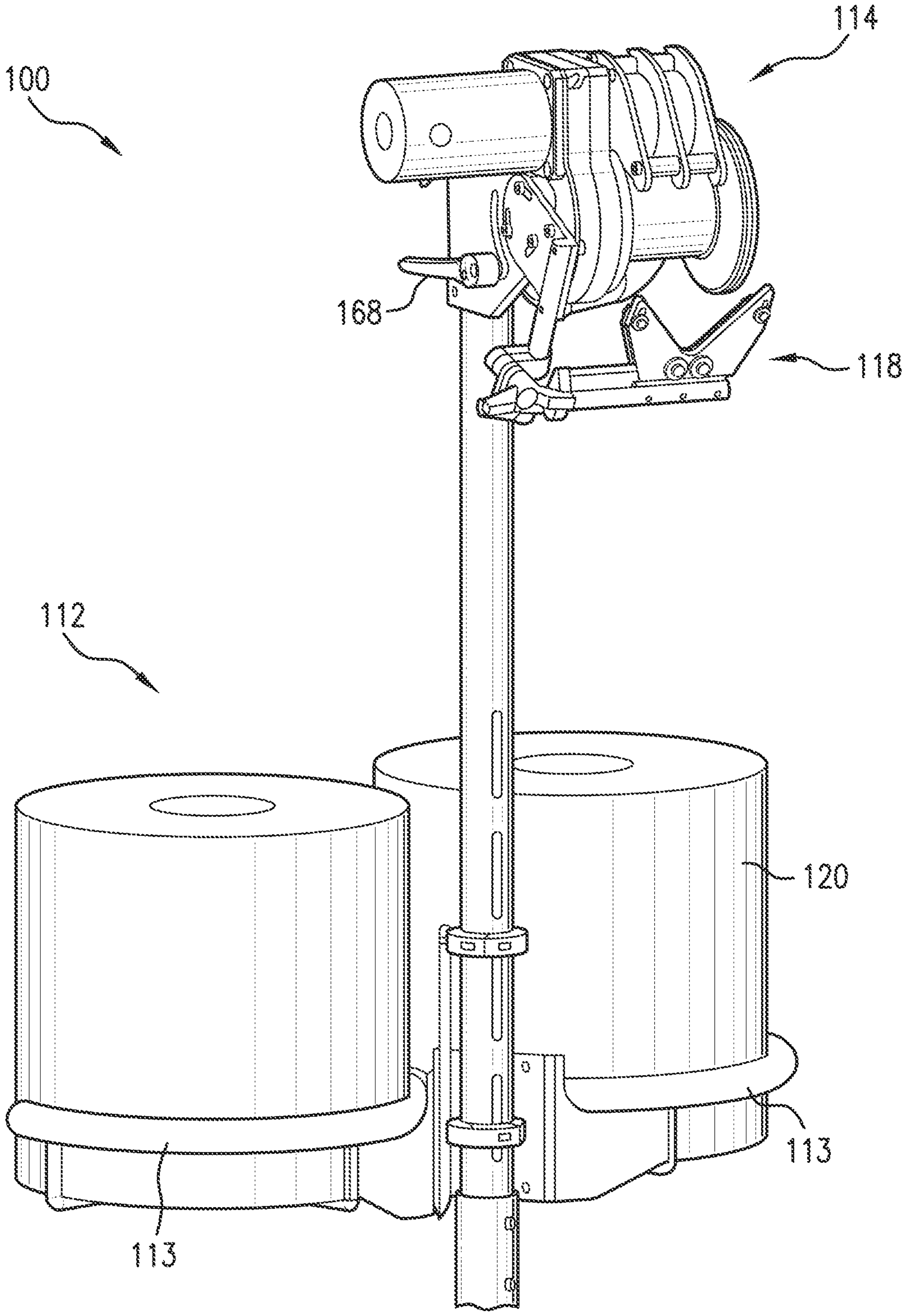
FIG. 8 is a front perspective view thereof.

Referring to FIG. 6, the dunnage system described may be used, in at least one embodiment, by positioning a sheet supply on the base (602). The gripping members may be directed into the sheet material or packaging (604). The sheet material may be pulled from the center of the sheet supply to form a twisted or coiled tube (606). The twisted tube or coil of sheet material may be directed between the drum and the roller (608). The twisted tube or coil may be pinched between the drum and roller to crumple the tube or coil and draw the tube along its longitudinal axis between the drum and roller (610). A length, or several lengths, of the drawn crumpled tube may then be cut or otherwise parted from the crumpled tube or coil (612) and used for packaging or otherwise.

Figure 9:
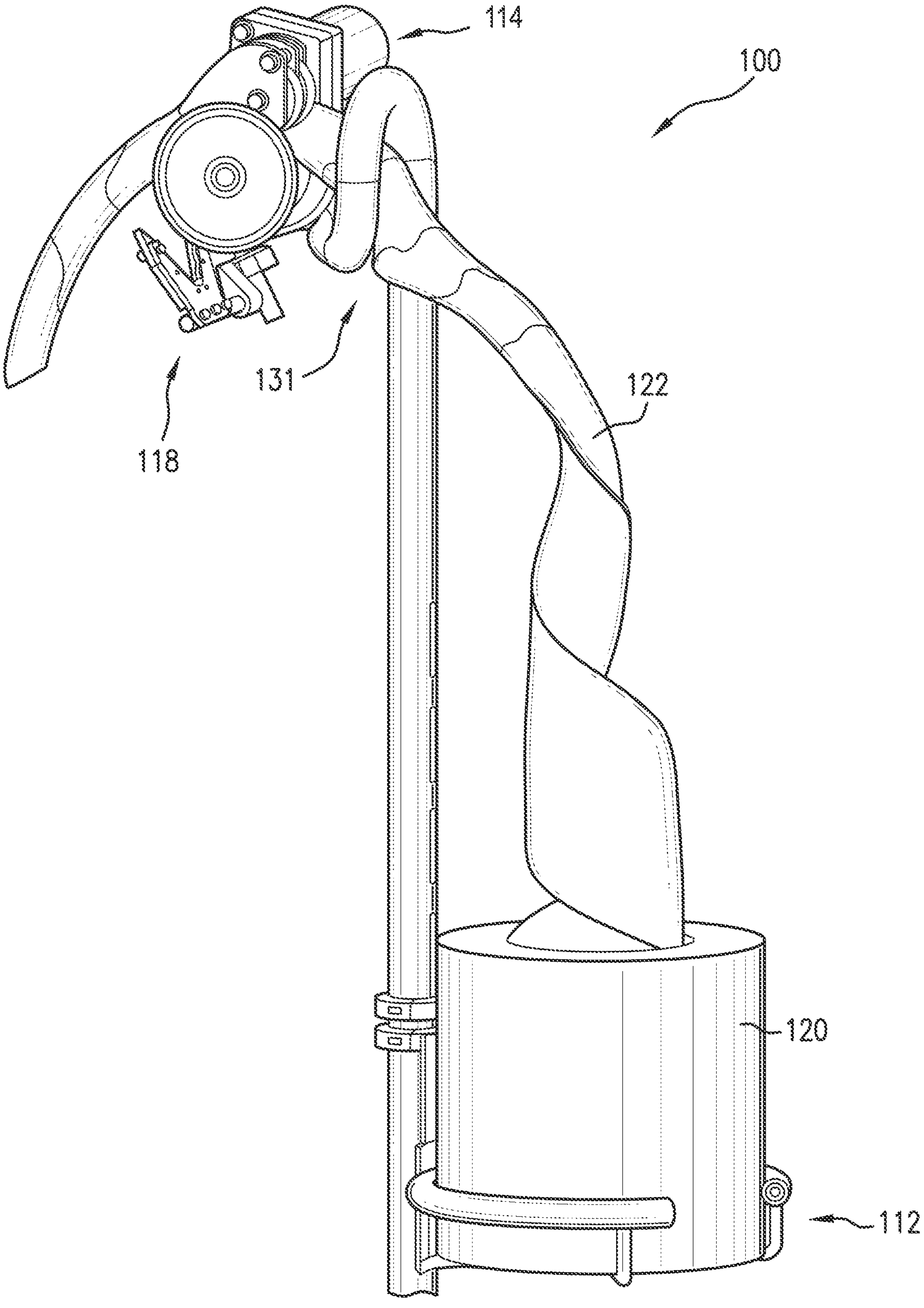
FIG. 9 is a side view thereof.

Referring now to FIGS. 7-10, another embodiment of a dunnage system 100 is shown. As with the previous embodiment, the system 100 may include a supply station 112, a converting station 114, and a parting device 118. The supply station 112 may be configured to support and hold one or more rolls 120 of sheet material. Once initially fed into the converting station 114, the converting station 114 may be configured for pulling a continuous coil 122 of sheet material from the center of a roll 120 as best shown in FIG. 9. The converting station 114 may convert the coil 122 of sheet material into dunnage and eject it. The parting device 118 may be positioned downstream from the converting station 114 and may be configured for parting the stream to create pieces of dunnage for use in packing.

As with previous embodiments, any of the supply station 112, converting station 114, or parting device 118 may be provided separately or some or all of the parts may be provided as a system. In addition, any of the parts herein described may also be provided and used with alternative versions or styles of the other parts. For example, the converting station 114 or 14 may be provided alone, together with a supply station 112 or 12 and/or parting device 118 or 18 described herein, or an alternative supply station and/or parting device not described herein. As such, while the system is described to include several of these parts, the disclosure should not be construed to require any of the parts of the system. In addition, some of the parts of the system may be combined or supported together and several combinations may be provided. For example, the supply station 112 may be supported off of the converting station 114 or vice versa and the physical support thereof may comprise part of the converting station 114, supply station 112, or both.

Turning now to FIGS. 11-14, a supply station 112 is shown. The supply station may include one or more roll supports 113. In the present embodiment, two roll supports 113 are provided. The roll supports 113 may include a roll supporting base 124, a surrounding containment device 126, and a support mechanism 128. As shown best in FIG. 8, the roll supports 113 may be supported off of a system support pole or post and may not have its own ground support, such as a foot or feet, or it may be secured to the floor or other surface. As such, the support mechanism 128 of the present embodiment is in the form of a bracket for engaging the system support pole. The bracket 128 may be adapted for sleevably engaging the system support pole to allow for pivoting motion of the roll support 113 about the support pole. As shown, the bracket 128 may include a pipe sleeve 130, for example. In alternative embodiments, the bracket 128 may include a hinge or other pivotable connection device for supporting the roll support 113 relative to the support pole. In still other alternative embodiments, the support mechanism 128 of the roll support 113 may include a leg structure or other support system for supporting the roll support 113 or entire supply station 112 in isolation from the remaining portion of the system 100. In still other alternative embodiments, the support mechanism 128 may include wheels, casters, or other moving elements allowing for adjustment of the position of the supply station 112 relative to other parts of the system.

In addition to the pipe sleeve 130, the bracket may include an extension portion 132 and an attachment portion 134. The extension portion 132 may be in the form of a bar or tube, for example, extending from the pipe sleeve 130 to separate the surrounding containment device 126 and roll supporting base 124 from the support pole. The extension portion 132 may be relatively short or a longer extension portion may be provided.

Figure 11:
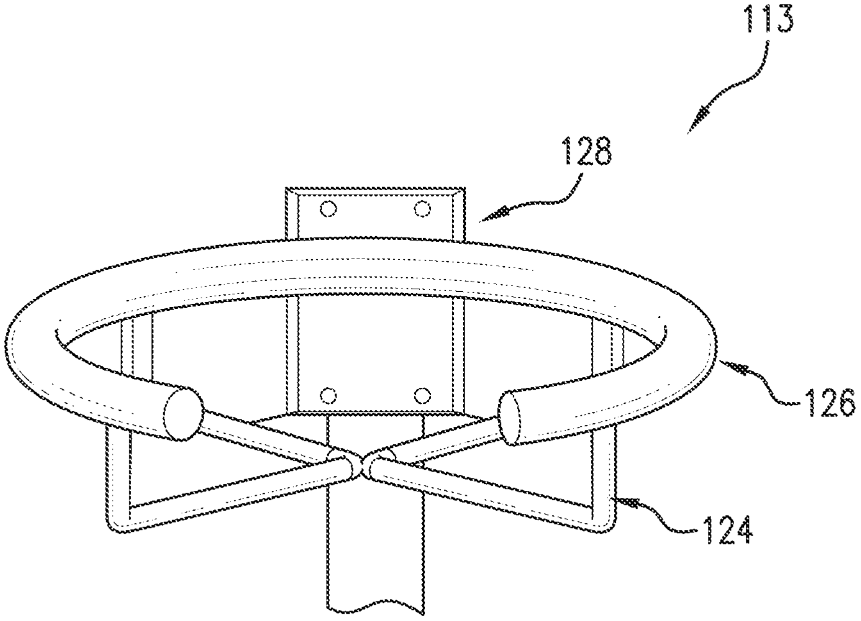
FIGS. 11-13 are a perspective, top, and support-post side view, respectively, of a roll support of the dunnage system.
Figure 14:
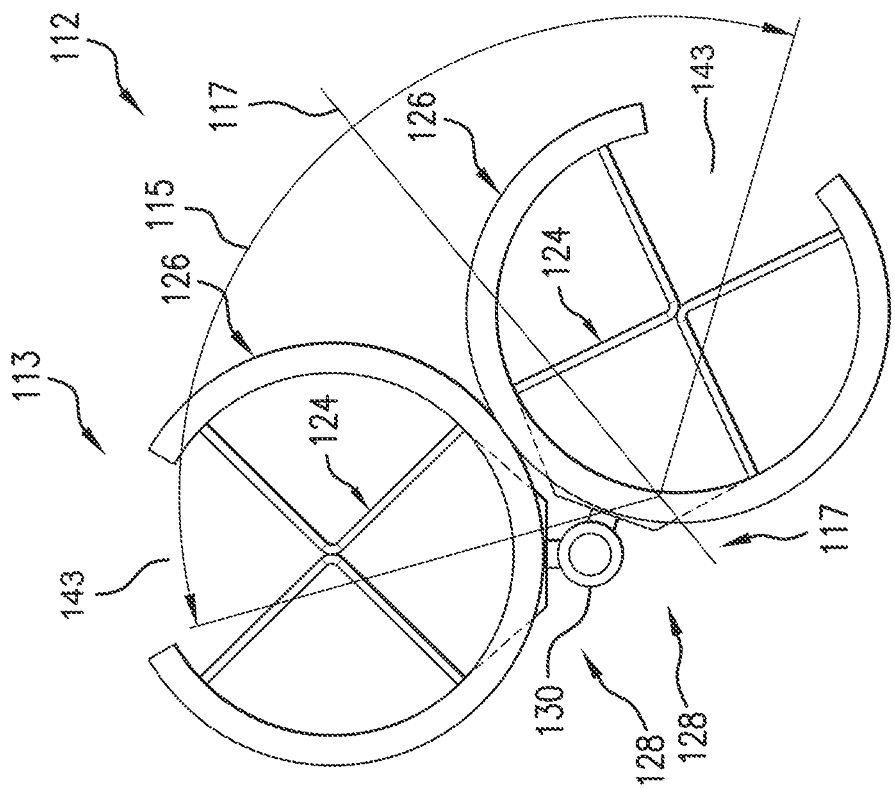
FIG. 14 is a top view of the supply station shown in FIG. 7.
Figure 13:
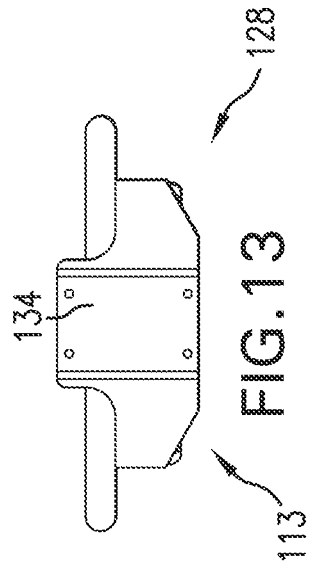

The attachment portion 134 of the bracket may be substantially plate like and may be bent to follow the contour of the surrounding containment. As shown in FIGS. 11 and 13, the attachment portion 134 may include a central portion extending the full height of the roll support 113 and slightly above the surrounding containment 126. The attachment portion 134 may also include two flanking sides extending from the central portion and under the surrounding containment 126 to engage wire or rod portions of the supporting base 124. The attachment portion 134 may have an included angle 136 of approximately 90°. Other included angles may also be provided.

Figure 12:
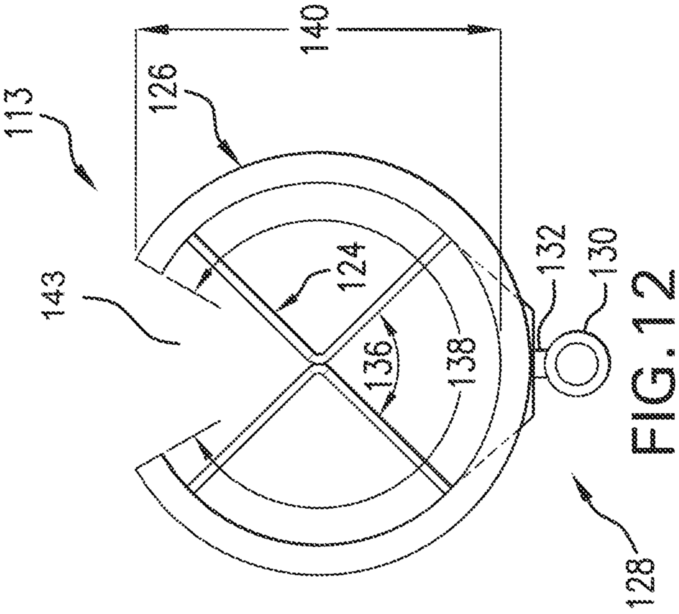

The roll supporting base 124 and the surrounding containment device 126 of the roll support 113 may be supported from the bracket 128 as shown. The surrounding containment device 126 may include a partial hoop structure oriented horizontally for tangentially engaging the periphery of a roll 120 of sheet material. In alternative embodiments, a full hoop structure may be provided. The partial hoop structure may have a cylindrical cross section allowing for smoothly receiving the roll 120 of material into the support 113. Other cross-sections may be provided. As shown in FIG. 12 and omitted from other figures, the partial hoop structure may have an included angle 138 ranging from approximately 180° to approximately 345°. The included angle may also range from approximately 235° to approximately 315°. In other embodiments, the included angle 138 may range from approximately 250° to approximately 290°. The partial hoop structure may have a diameter 140 ranging from approximately 6 inches to approximately 24 inches. In other embodiments, the diameter 140 may range from approximately 8 inches to approximately 16 inches. In still other embodiments, the diameter 140 may be approximately 12 inches.

The partial hoop structure may define an opening 143 and the opening 143 may be arranged opposite to the connection of the hoop structure to the bracket 128. The partial hoop structure may pass substantially tangentially along the central portion of the attachment portion 134 of the support bracket 128, as best shown in FIG. 12, and be fixedly secured thereto such as by welding, for example. Bolts, screws, or other fasteners may also be used. Where fasteners are used, countersunk or counterbored holes may be used to allow for a smooth interior finish on the hoop structure to avoid tearing, catching, or otherwise interfering with the outer surface of the roll of sheet material.

The supporting base 124 of the roll support 113 may include a series of rods or wires configured to extend down from the partial hoop structure and across the bottom of the roll support 113 for resting a roll 120 of sheet material thereon. The series of rods or wires may include cylindrically shaped members including cylindrical rods or tubes. Other cross-sectional shapes may also be provided. The rods or wires may form an X-shaped when viewed from above as shown best in FIGS. 12 and 14. As shown, the series of rods or wires may include two rods. The first rod may extend downward from the hoop structure defining a depth of the roll support 113. The first rod may then turn and extend across the roll support 113 to a point offset downward from a center defined by the radius of the hoop structure. The first rod may then turn 90° and extend outwardly toward the periphery of the roll support. The first rod may then turn upward and extend to the hoop structure. The second rod may be arranged similarly, thus, allowing for the X-shaped bottom of the roll support 113 while avoiding overlap of the rods, which may otherwise cause unevenness in the bottom of the support 113. The X-shaped bottom may be oriented to accommodate the opening 143. In use, a user may load a roll 120 into the roll support 113 by holding the roll on its axial ends and may place the roll in the support 113 without setting and shifting the roll 120. In alternative embodiments, the supporting base 124 may be a bowl or deep pan-like structure extending down from the hoop structure and across the bottom of the roll support 113. In some embodiments, the hoop structure may be omitted and the periphery of the bowl or deep pan-like structure may be thickened or otherwise stiffened to prevent warping.

Multiple roll supports 113 may be provided including 2, 3, or 4 roll supports 113 to form a supply station 112. Where smaller rolls of sheet material are provided, more roll supports 113 may be provided. The pivotable attachment of the roll supports 113 to the support pole may allow a particular roll support to be pivoted into position for suitably supplying sheet material to the system. The converting station 114 may include an inlet guide to be described below for guiding the sheet material from a particular roll support 113 into the converting station 114. Each roll support 113 may be angularly positionable relative to the converting station 114 and the position of any given roll support 113 may define a feed location. When viewed from above, for example as in FIG. 14, the roll supports 113 may define feed locations having an angular positionable range 115 of approximately 135°. That is, any one of the roll supports 113 may feed the converting station 114 from any positioned within the angular positionable range 115 shown. In other embodiments, the range may be approximately 100°, 90°, 60°, 45°, or 30°. Other ranges may also be provided. The angular positionable range 115 may be generally centered on a plan view feed direction 117 of the converting station 114 or, as shown, the range 115 may be skewed relative to a plan view feed direction 117. That is, a larger portion of the range 115 may be positioned to the left of the feed direction 117 when compared to the portion to the right of the feed direction 117. Therefore, the first and second feed locations are disposed respectively at first and second azimuths about the feed direction 117. Similarly, the angular positions have an azimuth about a throat axis.

Figure 10:
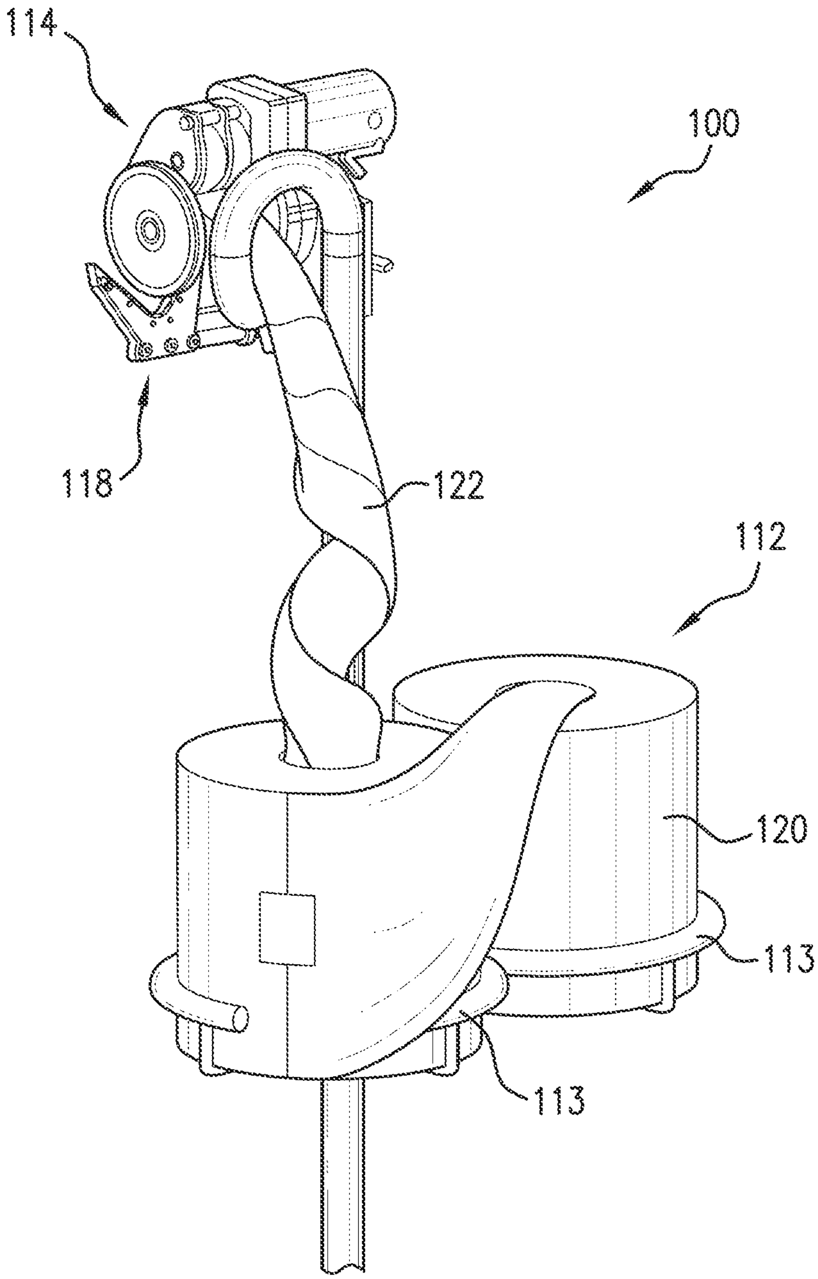
FIG. 10 is a perspective view similar to FIG. 7 showing a particular use thereof.

The supply station 112 may support one or more rolls 120 of sheet material. The rolls 120 may be oriented in the supply station 112 to feed the system with a counter clockwise spiraling coil as shown in FIG. 9. Alternatively, the roll 120 may be oriented to provide a clockwise spiraling coil. As shown in FIG. 10, where multiple rolls 120 of material are provided, the rolls 120, or other configurations if the supply units of the sheet material, may be daisy chained to one another allowing for uninterrupted feeding of the system when a first roll 120 of material is exhausted. In this embodiment, the inner edge of a second roll 120 of sheet material may be connected via an adhering sticker (e.g., the sticker commonly provided on rolls of paper to keep the first roll from unraveling) to the outer edge of the first roll 120. As such, when the first roll 120 is exhausted, the second roll 120 may begin supplying the system 100 with sheet material. While the second roll 120 is being fed into the system, a third roll 120 may be placed to replace the exhausted first roll 120 and daisy chained to the outer edge of the second roll 120. Accordingly, continuous uninterrupted sheet supply may be provided. Where additional roll supports 113 are provided, additional daisy chaining can be employed by attaching the outside layer of the roll being pulled through the converter to the center end portion of the next roll in the daisy chain, and so forth. In still other embodiments, the sheet material may be provided on pallets or carts in groups of 1, 2, 3, 4, 5, 6, or more rolls 120. The rolls 120 on a given cart may be daisy chained together and the last roll 120 on one cart may be daisy chained to a first roll 120 on an additional cart and so on.

Turning now to FIGS. 15-22, a converting station 114 is shown. The converting station 114 may be configured to pull a continuous stream of sheet material from a supply station 112 such as that described above. The converting station 114 may pull the stream therethrough to form a stream of dunnage and eject the stream of dunnage therefrom. In some embodiments, as described with respect to FIGS. 1-6, the converting station 114 may be particularly adapted for pulling the sheet material from a center of a roll 120 of sheet material creating a coiled stream 122 of material entering the converting station 114. The converting station 114 may include a support portion 142 for supporting the station and an inlet guide 144 for guiding the sheet material into the station 114. The converting station 114 may also include a converter 146 for converting the coiled stream of sheet material into dunnage. The converting station 114 may also include a drive portion 148 for providing power to the converter 146. Each of these portions of the converting station 114 may be described in detail.

The support portion 142 may be configured to support the inlet guide 144, the converter 146, and the drive portion 148. In the embodiment shown, the support portion 142 and the inlet guide 144 are shown combined into a single rolled or bent elongate element forming a support pole or post. In this particular embodiment, the elongate element is a pipe or tube having a round cross-section. Other cross-sections may be provided. In the embodiment shown, the elongate element has an outer diameter of approximately 1½". In other embodiments, the diameter may range from approximately ¾" to approximately 3" or from approximately 1" to approximately 2". Other diameters outside the range provided may also be used. The elongate element may extend from a floor base configured to provide lateral stability to the converting station. The floor base may include a platform from which the elongate element extends or a plurality of crossing members, for example, may be provided. Adjustable feet may be provided for leveling and stability. The base may be similar to that shown in FIG. 1 or a broad shaped plate-like base may be provided. Other shaped and configured bases may also be provided.

Figure 18:
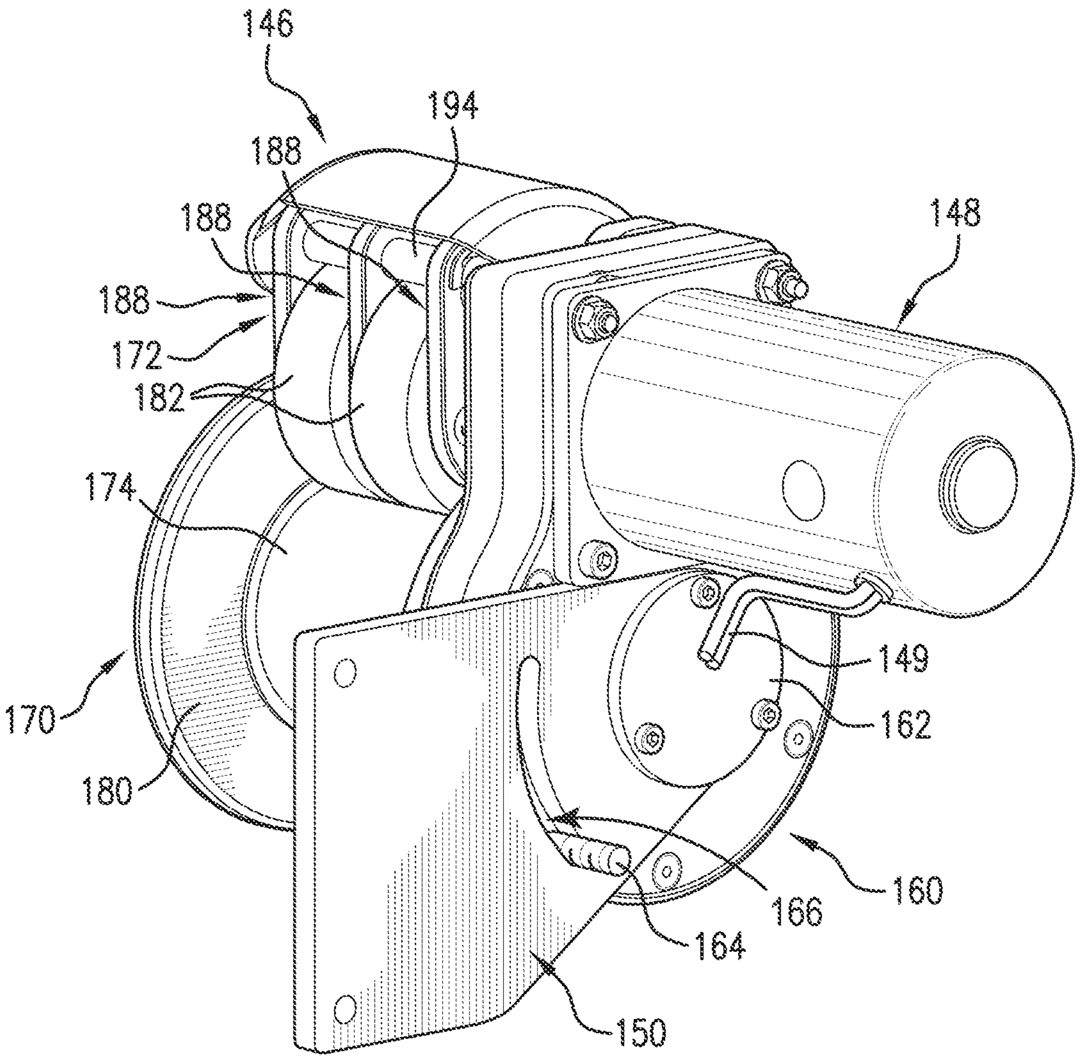
FIG. 18 is a rear, left perspective view of a converter and drive portion of the converting station of FIG. 15.
Figure 19:
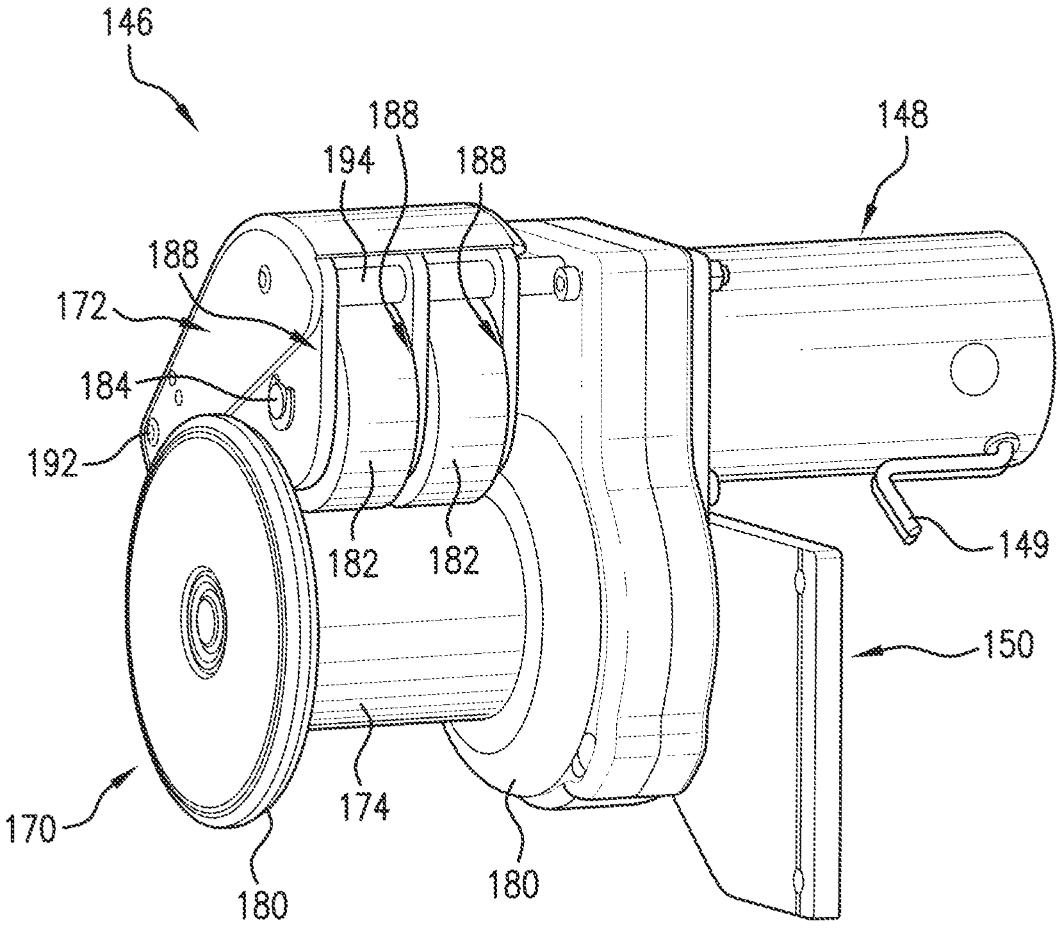
FIG. 19 is rear, right perspective view thereof.

The elongate element may be rigidly affixed to the base to prevent relative translation or rotation of the element relative to the base. The elongate element may extend upward from the base and may include a supporting bracket 150 near its top for connection to and support of the converter 146 and the drive portion 148, thus, forming the support portion 142. The elongate element may be substantially continuous between the base and the supporting bracket 150 and may thus transfer vertical and lateral loads imparted on the converter 146 and drive portion 148. In other embodiments, the elongate element may be discontinuous between the base and the supporting bracket 150 and rigid connections such as overlapping sleeve connections may be provided. The bracket 150 may extend from the elongate element and may be rigidly affixed thereto via welding, bolting, or another fastening mechanism. The bracket 150 may be a generally flat plate-like element and, as shown in FIG. 18, for example, may have an arcuate end opposite the connection to the elongate element.

Figure 15:
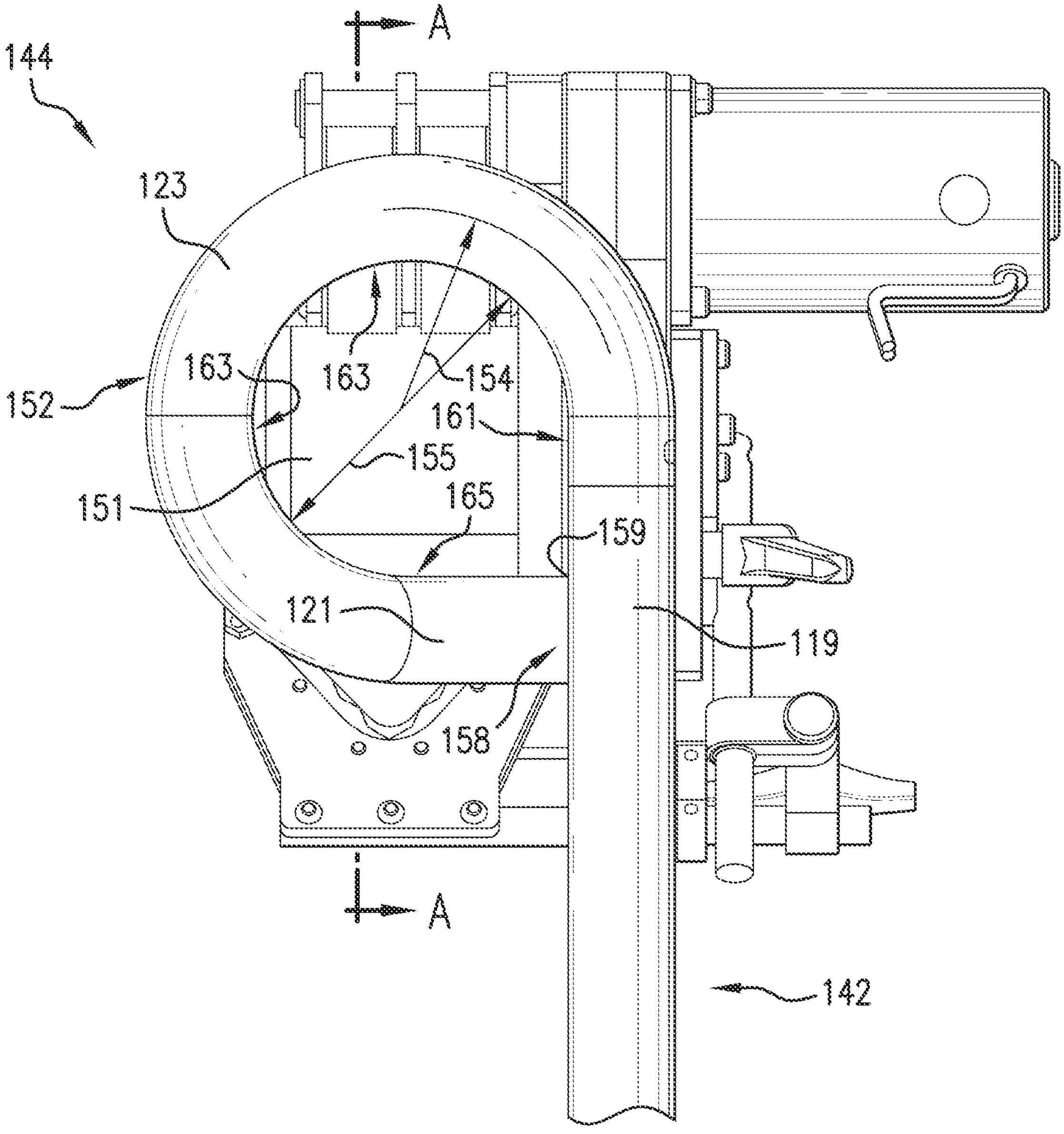
FIG. 15 is a rear view of a converting station of the system of FIG. 7.

The inlet guide 144 may also be provided by the elongate element. That is, as shown in FIG. 15, the elongate element may extend beyond its connection to the support bracket 150 and may be rolled, bent, or otherwise shaped to form an inlet guide 144 for the sheet material to enter the converter 146 of the converting station 114. As shown best in FIG. 15, the inlet guide 144 may extend from the bracket 150 and may form an arcuate coil 152. The coil 152 may define a throat passing therethrough having a radius 154 adapted to control the size of the sheet material coil 122 entering the converter 146. For example, where the converter 146 includes a converting drum 174, the drum 174 may have a width 178 and the throat of the guide coil 152 may have an inner diameter 155, which is preferably within about 50% of the drum width 178, and preferably slightly larger. The radius 154 of the guide coil 152 can be, for example, approximately equal to half of the width 178 of the drum 174, and preferably between about ¼ to ¾ times the width 178. As is clear in FIG. 15, the throat radius 154 of the embodiment shown extends from the axis of the throat. Other relationships between the throat radius 154 and drum width 178 may also be provided.

Figure 16A:
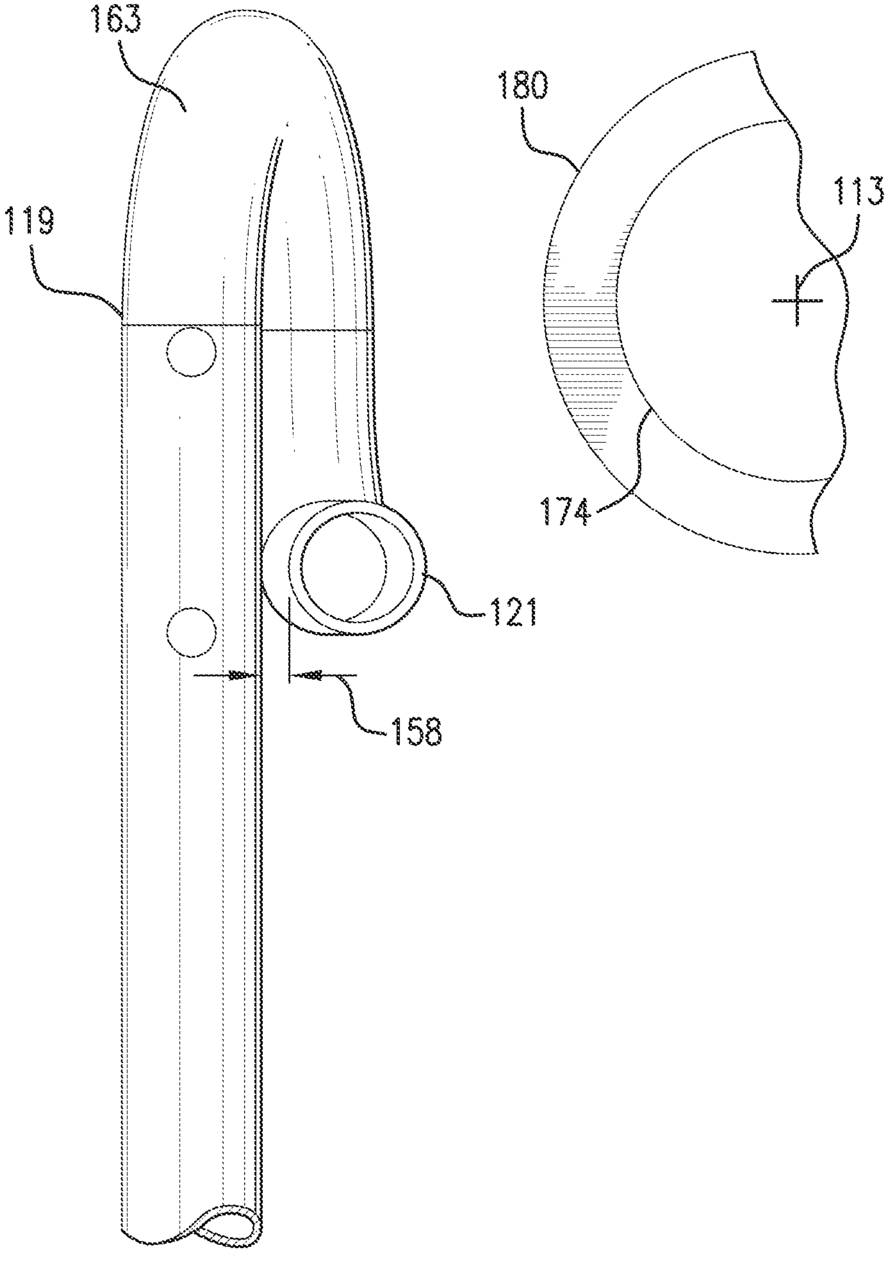
FIGS. 16A and 16B are left side and perspective views of an inlet guide of the converting station of FIG. 15.
Figure 16B:
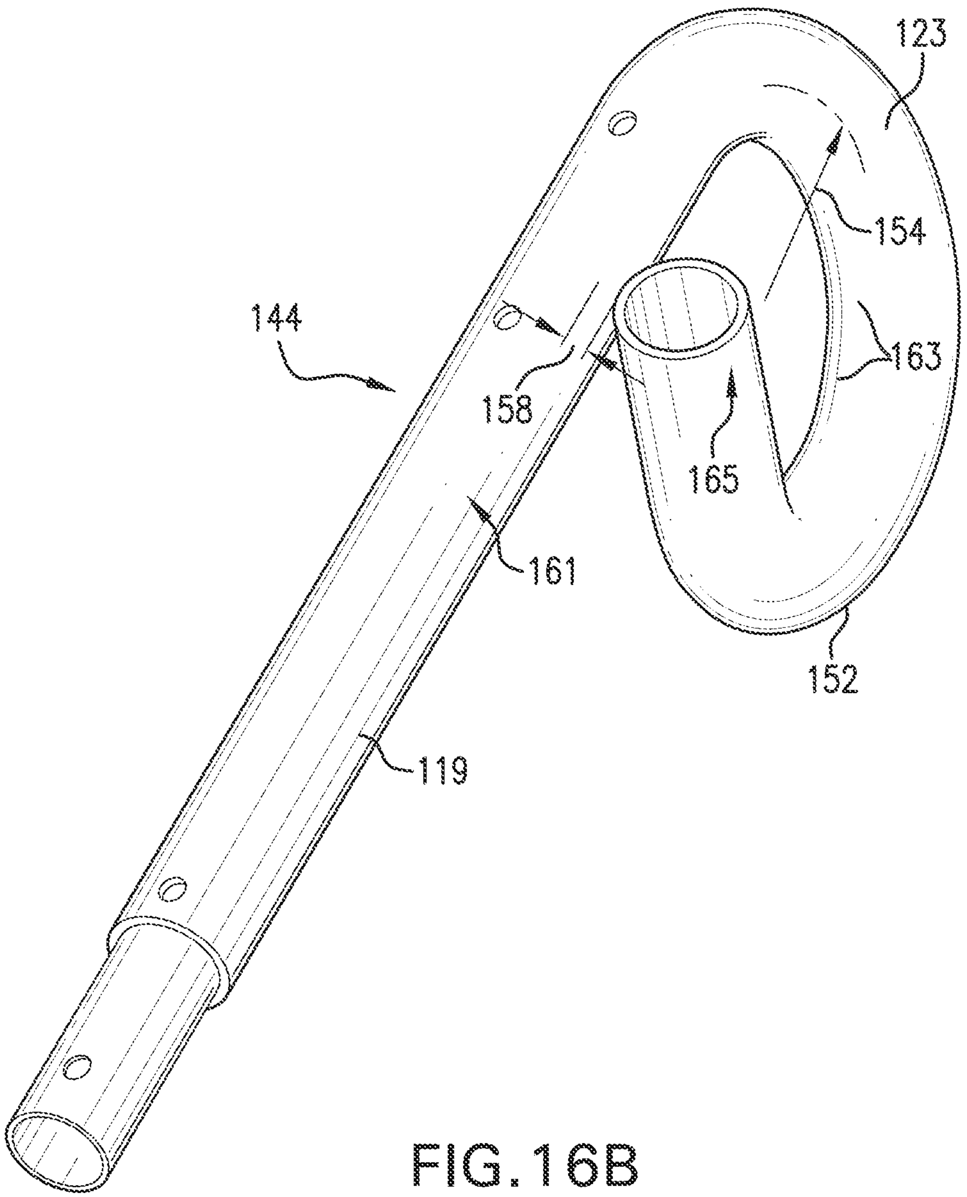

The guide coil 152 may extend from a beginning segment 119 where the support portion 142 stops and is connected to the supporting bracket 150. As shown in FIGS. 16A and 16B, the beginning segment 119 may be generally straight and may lead to an arcuate segment or portion 123 of the coil 152. The arcuate portion 123 may be defined by a radius 154 and may extend across the top of the feed path of the dunnage and down the side opposite the support bracket 150. The radius 154 of the arcing coil in the preferred embodiment may range from approximately 1" to approximately 8" or from approximately 1½" to approximately 4". In still other embodiments, the radius may range from approximately 2½" to approximately 3½", for example. The coil 152 may then bend across the bottom of the feed path and generally back toward the support portion 142. The coil 152 may include another segment, such as a finishing segment 121, that extends generally horizontally to a position downstream of the support portion 142. While the beginning and ending segments 119, 121 are preferably straight or generally straight, in some embodiments the are curved, but with a larger radius than the arcuate portion 123.

The coil 152 may have a pitch 156 allowing the finishing segment 121 to be positioned downstream of the beginning segment 119. As best shown in FIG. 17, an embodiment of the coil has a pitch angle 156 ranging from approximately 5° to approximately 60°, from approximately 10° to approximately 45°, or about 15° to 20°. In one preferred embodiment, the pitch angle 156 is about can be 18 or 19 degrees. Preferably both the front and back sides of the arcuate portion 163 are at an angle to the axis 173 of the drum 174, such as when viewed from below in the preferred embodiment so that both front and back portions thereof, including the finishing segment 121, are coiled towards the drum towards the finishing segment 121. In one embodiment, the pitch 156 may be approximately 30°. In another embodiment, the front or rear side of the guide coil 152 can be parallel to the drum axis 173.

As such, the free end of the finishing segment 121 of the coil may be spaced apart from the beginning segment 119 forming a gap 158 therebetween. The inlet surface can be coiled such that first and second ends of the inlet surface are discontinuous with each other to define the gap therebetween, to channel the sheet material into a converter. The inlet surface can be coiled such that first and second ends of the inlet surface are discontinuous with each other, with one of the ends being disposed closer to the converter. Although in some embodiments, finishing segment 121 may contact the side portion 161. The gap 158 may range from approximately ½" to approximately 4". In other embodiments, the gap 158 may be range from approximately 1" to approximately 3". In other embodiments, the gap 158 may be approximately 2". In some embodiments, the gap 158 may approximate the diameter of the elongate element or be slightly larger, for example. The gap 158, for example, can be between about 5% or 10% to 50%, 100%, or 300% of the diameter of the tubing from which the guide coil 154 is made. Other gap sizes may be provided that are larger or smaller than the gaps mentioned.

When viewed in a longitudinal direction from the back of the system, for example as shown in FIG. 15, the inlet guide opening 151 may have a generally straight right side portion 161 associated with the beginning segment 119, a generally arcuate portion 163 associated with the arcuate portion 123 of the coil, which can form the top and left sides. In the embodiment shown, the arcuate portion 163 has an included angle of approximately 270°, although other angles can be used. A generally straight bottom portion 165 associated with the finishing segment 121 may also be included. Preferably, the bottom and one side portion 165, 161 are generally horizontal and vertical, respectively, with the horizontal, bottom portion 165, 161 extending downstream from the upright side portion 161. The beginning segment 119 forming the right side portion 161 and the finishing segment 121 forming the bottom portion 165 may form a perceived corner 159 in the inlet guide 144 in the lower right portion of the guide 144. In some embodiments, the beginning segment 119 and the finishing segment 121 may have a perceived/projected intersection angle, measured within the inlet guide 144, of approximately 90° as shown. In other embodiments, the perceived intersection angle may range from approximately 60° to approximately 120°. In still other embodiments, the perceived intersection angle may range from approximately 75° to approximately 105°.

Figure 17A:
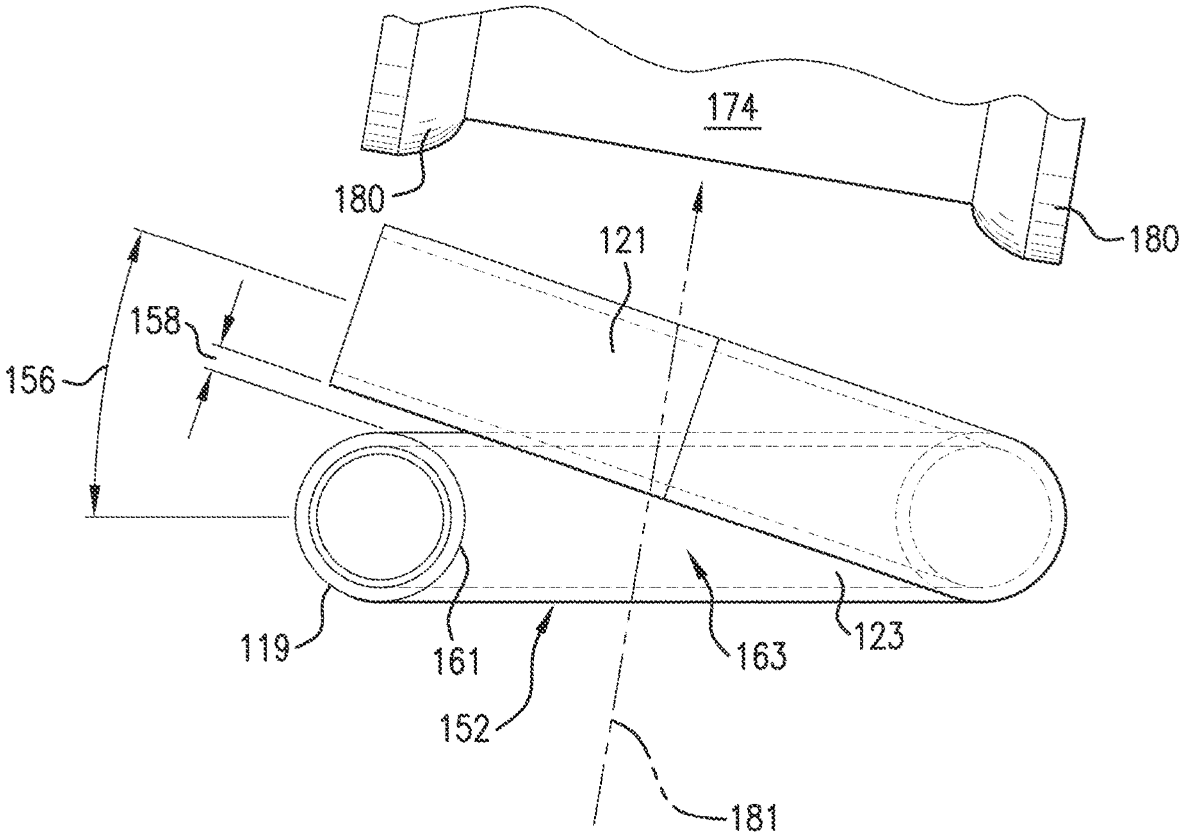
FIG. 17A is a bottom view thereof.
Figure 17B:
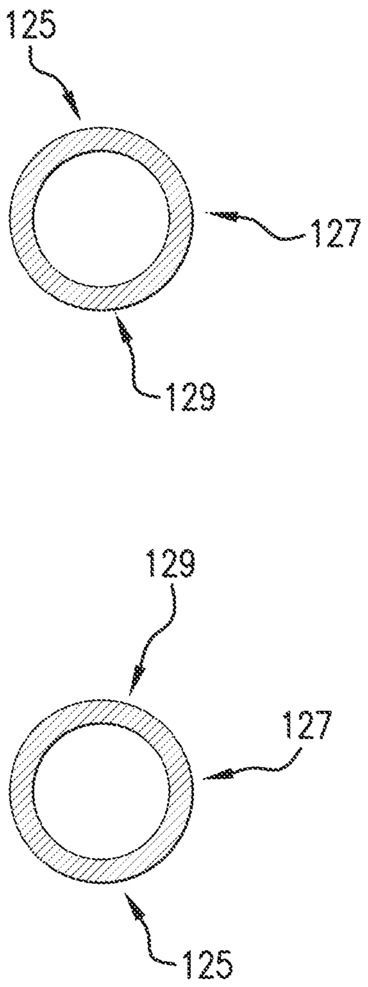
FIG. 17B is a cross-sectional view of the inlet guide taken along line A-A shown on FIG. 15.

With particular reference to FIG. 17B, the cross-section of the inlet guide 144 may include a radially outer surface 125, an inlet surface 127, and a radially inner surface 129. The inlet surface 127, when viewed in cross-section, may be curved from the radially outer surface 125 to the radially inner surface 129 for guiding the sheet material into the inlet guide 144 and preventing or reducing catching on the material. The radially inner surface 129 may be similarly curved to gradually engage the sheet material and allow the sheet material to gradually leave its surface to avoid catching or grabbing the material as it passes by. The radially outer surface may also be curved smoothly guide the sheet material to a position for passing through the inlet guide 144. That is, in some cases, the relatively quickly moving stream may whip or move relatively erratically prior to passing through the inlet guide 144. In some cases, the stream may tend to whip around toward a front side of the inlet guide 144 between the guide 144 and the converter 146, but prior to passing through the inlet guide 144. This may be particularly the case when, for example, the supply station 112 is positioned upstream, but toward the side, of the inlet guide 144. For example, as best shown in FIGS. 9 and 10, the sheet material leaving the roll 120 may be traveling relatively quickly and gaps may form between adjacent bands of the coiled sheet material. Particularly when the roll 120 is positioned upstream and toward the side of the inlet guide 144, these gaps may have a tendency to allow a band of the sheet material to whip around and pass behind the inlet guide creating drag and potentially tearing the incoming stream of sheet material. In these cases, the smoothly curved radially outer surface 125 may allow catching on the outside of the inlet guide 144 to be reduced or avoided.

It is noted that while a round pipe-like cross-section is shown, the inlet guide 144 may have other cross-sections including square, rectangular, triangular, octagon, for example. Other cross-sections may also be provided including combinations of shapes. For example, in some embodiments, the inlet guide 144 may have a cross-section having a curved inlet surface 127 and a generally flat radially outer surface 125 and radially inner surface 129, each extending in the downstream direction and converging to a point. This cross section may be adapted to further prevent the sheet material from catching on the sides of the inlet guide 144 or wrapping around behind the guide 144 as mentioned above. By deepening the cross-section of the inlet guide 144, particularly along the sides, the incoming sheet material may be prevented from passing behind the inlet guide 144. Other side protecting elements may be provided and may be part of the elongate element cross-section or separate therefrom. Other cross-sections of the inlet guide 144 may also be provided and the cross-sections may also be hollow or solid. In addition, the cross-section of the elongate element may be the same along the length of the support portion and the through the inlet guide 144 or the cross-section may change from one portion to the other. The elongated element may be made from steel, aluminum, steel alloy, or a composite material. Other materials may also be provided.

With reference again to FIG. 15, and with the details of the inlet guide 144 having been described, the inlet guide 144 may provide a transition or bend in the incoming coil of sheet material and thus change the direction of the sheet material to feed it into the converter 146. The inlet guide 144 may function to affect both a horizontal and vertical component of the sheet material direction.

For example, where the roll support 113 is positioned on the right side of the device, to the left in FIG. 15, the stream of material 122 may extend generally upward and generally leaning to the right (in FIG. 15) as it enters the inlet guide 144 near the transition between the arcuate portion 123 of the inlet coil and the straight finishing segment 121 of the inlet coil. This lower left portion of the arcuate coil may cause the stream of material to bend about both a horizontal axis and a vertical axis. As such, the vertical component of the stream may be changed to generally horizontal and the rightward leaning component of the stream may be changed to generally longitudinal relative to the converter 146. The gap 158 may be positioned sufficiently near or at the location that causes the bend in direction of the stream and can be configured to help prevent the material from being caught between the beginning and finishing segments 119, 121, and the deflection of the finishing segment 121 in the downstream direction may help reduce stress on the sheet which could tear it. Especially when the sheet material is coiled counter clockwise exiting from the supply roll 120, the opening between coiled edges of the sheet can extend around and trap the left side of the guide coil 152. The outer curvature of the guide coil 152 is preferably selected to prevent catching the coiled material at this point, and letting the sheet feed around the outside of the guide coil 152 and into the opening 151.

Where the roll support 113 is positioned on the left side of the device, to the right in FIG. 15, the stream of material 122 may be extending generally upward and generally leaning to the left (in FIG. 15) as it enters the inlet guide 144 at a perceived intersection of the beginning segment 119 and finishing segment 121 of the coil. In this case, the beginning segment may create a bend in the stream changing the direction of the stream from rightward leaning to generally longitudinal with respect to the converter 146. After passing by the beginning segment 119, as the stream passes along the gap 158 the stream may be directed generally upward, but generally longitudinally with respect to the converter 146. The stream may then encounter the finishing segment of the coil creating an additional bend in the stream and changing the vertical component from generally upward to generally horizontal. In this particular case, the gap 158 may be particular advantageous for reducing stresses in the material stream by preventing pinching or bunching of the stream in the lower right corner of the coil. Moreover, the size of the gap may further be advantageous for avoiding catching of the stream passing along the lower left corner of the inlet guide 144. This separated change in direction relying on the beginning segment first 119 followed by the finishing segment 121 may allow for a broader range of angular position of the feed location described in FIG. 14. When the roll support 113 is disposed at the extreme right of the device, such as near or past 90° to the longitudinal axis 117, the stream of the sheet material may initially be guided around the beginning segment 119, then passing over the generally straight and horizontal finishing segment 121. In this situation, the gap 158 also helps reduce stress (and strain) and tearing at the intersection of the beginning and finishing segments 119, 121.

It is noted that the latter example of roll support position 113 reveals that, while all or a portion of the inlet guide 144 may be arcuate, other inlet guide orientations may also be provided. That is, generally straight bars or tubes may be provided and may be configured for changing a single component of the sheet material direction by bending or transitioning the incoming sheet material about the bar or tube. Additional bars or tubes may then be positioned downstream by a suitable gap to change another component of the sheet material direction. As such, in some alternative embodiments, the inlet guide 144 may be a series of generally straight elongate elements each arranged to change a single component of the sheet material direction. The collective series of elongate elements may change the starting direction of the sheet material to a longitudinal direction for feeding the converter.

As described, the sheet material entering and passing through the inlet guide 144 may be redirected toward the converter. In addition, where the stream is relatively erratic the stream may be necked down and controlled for more suitably entering the converter 146 portion of the converting station 114. The inlet guide 144 may be substantially continuous providing for a clean and smooth path for the sheet material to pass. The shape of the inlet guide 144 may allow for the flexibility in the angular feed location of a particular roll support 113 as described with respect to FIG. 14 above. That is, the shape may provide smooth transitions or bends in the stream to direct the stream toward the converter 146 from multiple directions. The cross-section described, particularly, the radially outer surface, the inlet surface, and radially inner surface may provide for a smooth surface over which the sheet material may pass and may allow for catches, tears, or snags to be avoided.

Turning now to the drive portion 148 and converter 146, reference may be made to FIGS. 18-22. As shown, a central housing 160 may be provided between the drive portion 148 and the converter 146 for securing each to the support bracket 150 and operably engaging the drive portion 148 with the converter 146. The central housing 160 may be arranged adjacent to the support bracket 150 and may be secured thereto with a mounting plate 162 having a center about which the housing 160 may rotate. A tracking pin 164 may also be provided and may be arranged in an arcuate slotted hole 166 in the bracket. The housing 160 may include a locking mechanism 168 associated with the tracking pin 164, as show best in FIG. 8. The locking mechanism 168 may be configured for locking the housing 160 in position relative to the bracket 150 and preventing free rotation of the housing 160 about the center of the mounting plate 162. The locking mechanism 168 may be a threaded device, cam device, or other device configured to frictionally engage the bracket. The locking mechanism 168 may include a locking lever for actuating the locking mechanism 168. In some embodiments, as shown, the locking mechanism 168 may be in the form of a quick-release type mechanism where, for example, the locking lever sleeved over a threaded bolt and adapted to selectively engage the bolt. The lever may be biased toward an engaged position, while pulling the lever in a direction away from the bolt may allow the lever to spin freely relative to the bolt. As such, the lever may begin in a start position and may be rotated to a finish position rotating the bolt therewith. The lever may then be pulled to release its engagement with the bolt and rotated back to a start position and then released to reengage the bolt where the lever and bolt may again be rotated to tighten the bolt. The rotation of the bolt may tighten frictionally engaging plates, washers, or nuts on opposite sides of the bracket thereby securing the rotational position of the housing relative to the bracket.

In some embodiments, while not shown, the housing 160 may be adapted to receive the support bracket 150 for a cleaner look. In this embodiment, the housing 160 may include a bracket receiving slot having a width substantially equal to the width of the bracket 150 allowing for positioning of the slot over the bracket 150.

Turning now to the drive portion 148, a motor connected to a power source, such as an outlet via a power chord 149, may be provided and may be arranged and configured for driving the converter 146 to be described below. As such, the drive portion 148 may include a transmission portion for transferring power from the motor to the converter 146. Alternatively, a direct drive may be used. The motor may be arranged in a housing and may be secured to a first side of the central housing 160 opposite that of the converter 146. The transmission may be contained within the central housing 160 and may be operably connected to a drive shaft of the motor and a drive portion of the converter 146 thereby transferring motor power to the converter 146.

Turning now to the converter 146 and with particular reference to FIGS. 18-22, a pulling portion 170 and a pressing portion 172 may be provided. The converter 146 may be configured for pulling the sheet material from a supply station 112, passing the sheet material therethrough, and converting the sheet material into dunnage. The pulling portion 170 may thus provide for pulling the material into and through the converter 146 while the pressing portion 172 may provide for pressing the sheet material against the pulling portion 170 to crease, crush, or otherwise convert the dunnage.

The pulling portion 170 may be in the form of a driven drum 174 adapted to frictionally engage the sheet material. In alternative embodiments, the pulling portion 170 may, for example, include a reciprocating plate or an oscillating plate where the plate frictionally engages the sheet material in a first direction and returns to a start position without frictionally engaging the sheet material. The repeated process may then incrementally advance the sheet material into and through the converter.

As shown in FIGS. 18-22, the pulling portion 170 of the present embodiment may be in the form of a cylindrical drum 174. The cylindrical drum 174 may be arranged such that the axis 173 of the drum 174 is aligned with the center of the mounting plate 162 attaching the central housing 160 to the support bracket 150. The cylindrical drum 174 may be driven by a drive shaft extending therethrough or it may be driven by a gearing or other drive mechanism engaged with, for example, an axial side of the drum 174. The drive shaft may be operably connected to the transmission of the drive portion 148 thereby allowing rotational motion of the drum 174 to be imparted by actuation of the motor. Where a transmission is not included, the drive shaft may be directly connected to the motor.

Figure 21:
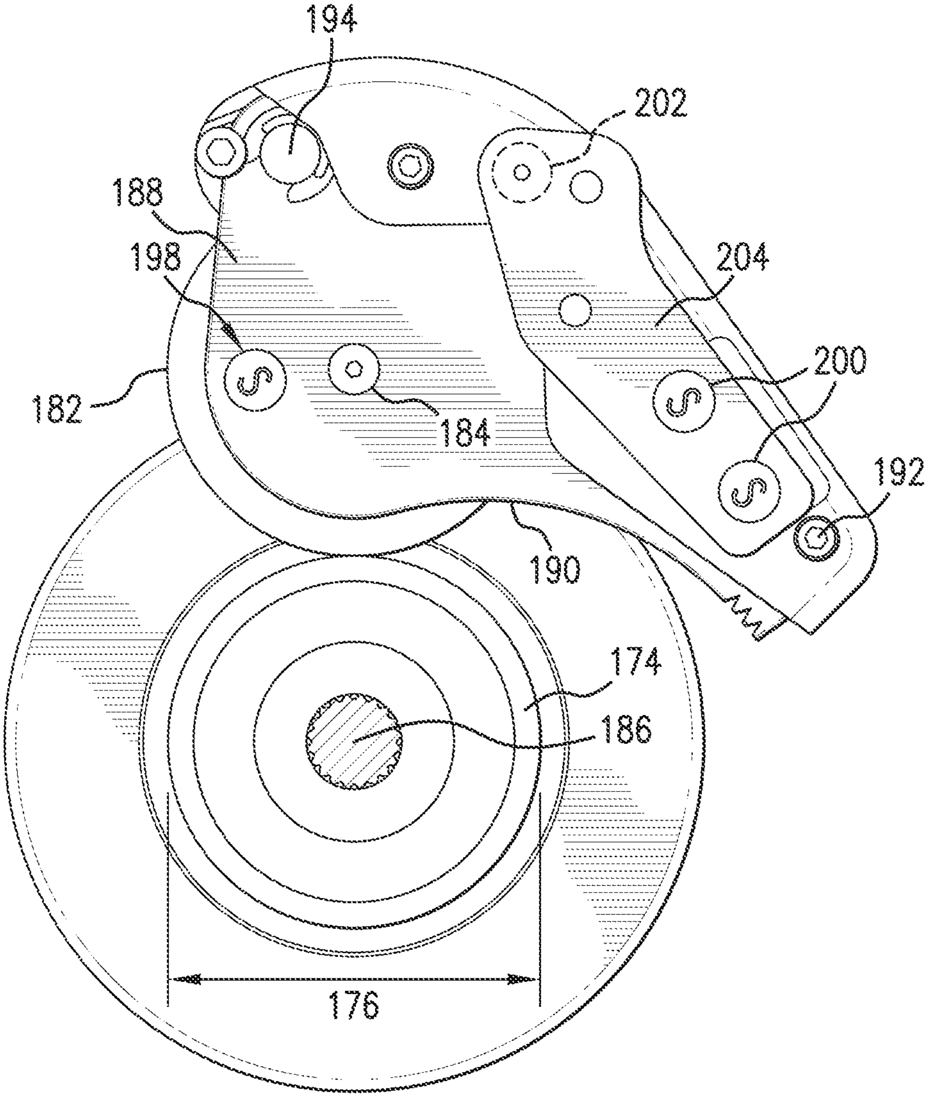
FIG. 21 is a cross-sectional, left-side view through the converter of FIG. 18.

The drum 174 may have a diameter 176, as best shown in FIG. 21, ranging from approximately 2" to approximately 8". In other embodiments, the drum diameter 176 may range from approximately 3" to approximately 6". In still other embodiments, the drum diameter 176 may be approximately 4 to approximately 5". Other diameters 176 outside the ranges mentioned may also be provided. The drum 174 may have a width 178 also ranging between approximately 2" to approximately 8", or approximately 3" to approximately 6", or approximately 4" to approximately 5". The drum 174 may also include a gripping surface for frictionally engaging and pulling the sheet material through the converter 146. The gripping surface may be provided, for example by a coating adhered to the drum surface, or a traction layer wrapped around and adhered to the drum surface. In other embodiments, the gripping surface may be provided by surface modifications of the drum surface such as roughening, stamping, or perforating, for example. In the present embodiment, a traction layer in the form of an elastomeric material is wrapped around the drum and adhered thereto. The elastomeric material may include natural rubber, isoprene rubber, ethylene propylene rubber (EPM), ethylene propylene diene rubber (EPDM), or other rubbers. Other materials may also be used.

Like the drum 50 above, the pulling portion 170 of the present embodiment may also include one or more drum guides 180 arranged on axial ends thereof laterally on either side of the feed path with respect to the feed direction. The drum guides 180 may help to guide the sheet material toward the center of the drum 174. In the present embodiment, an inner drum guide 180 may be operably connected to the drum 174 to rotate with the drum 174 and at the same speed as the drum 174. In contrast, the outer drum guide 180 may be operably connected to the drum 174 to rotate freely with or without the drum 174. As such, the outer drum guide 180 may be supported off of the drive shaft 186 of the drum 174 via a bearing or other isolating element for allowing the drum guide 180 to rotate relative to the drum 174. In addition, the outer drum guide 180 may be isolated from the axial side of the drum 174 by an additional space, bearing, or other isolation element for minimizing the transfer of rotational motion from the drum 174 to the outer guide. This can provide a safety feature in that a user grasping the outer guide or contacting it with his or her fingers will not have his or her hand pulled into the converting location of the converting station where the sheet material is crushed, flattened, etc. In other embodiments, the outer drum guide 180 may be supported via a bearing off of the outer axial side of the drum 174 rather than off of the drive shaft 186, for example.

The drum guides 180 of the present embodiment may otherwise be the same or similar to the guides 56 described above with respect to FIG. 4. However, as shown, the drum facing surface of the drum guides 180 may be convex as previously described or they may be generally conically shaped. As shown best in FIG. 17A, the inner surface of the drum guides 180 may have an orientation such that an extension of the surface is directed at least outside the boundary of the radially inner surface 129 of the inlet guide 144. In some embodiments, as shown, the inner surface of the drum guide 180 may be oriented such that the extension thereof extends outside the radially outer surface of the inlet guide 144. Also shown is FIG. 17A is the axial feed direction 181 through the inlet guide 144.

The pressing portion 172 of the converter 146 may be provided for pressing the sheet material against the pulling portion 170 to crease, crush, or otherwise convert the sheet material into dunnage. The pressing portion 172 may also help to develop friction between the pulling portion 170 and the sheet material such that the pulling portion 170 may engage the sheet material sufficiently to pull it into and through the converter 146. As such, the pressing portion 172 may in the form of a pressing roller or rollers for example. In alternative embodiments, the pressing portion 172 may include a smooth surface in continuous contact with the sheet material for pressing the sheet material against the pulling portion, but allowing it to slide along the smooth surface. In other embodiments, the pressing portion 172 may be in the form of reciprocating or oscillating plates coordinated with reciprocating or oscillating plates of the pulling portion 170 to incrementally grasp and advance the sheet material into and through the converter 146.

With continued reference to FIGS. 18-22, the pressing portion 172 may include a pressing member such as a roller or rollers 182. The rollers 182 may be supported via a bearing or other substantially frictionless device positioned on an axis shaft 184 arranged along the axis of the rollers 182. The rollers 182 may have a circumferential pressing surface arranged in tangential contact with the surface of the drum 174. That is, as shown best in FIG. 21, for example, the distance between the drive shaft or rotational axis 186 of the drum 174 and the axis shaft 184 of the rollers 182 may be substantially equal to the sum of the radii of the drum 174 and the rollers 182. The rollers may be relatively wide such as ¼ to ½ the width of the drum and may have a diameter similar to the diameter of the drum, for example. Other diameters of the rollers may also be provided. The roller diameter may be sufficiently large to control the incoming material stream. That is, for example, when the high speed incoming stream diverges from the longitudinal direction, portions of the stream may contact an exposed surface of the rollers, which may pull the diverging portion down onto the drum and help crush and crease the resulting bunching material.

The axis shaft 184 of the rollers 182 may be supported by a plurality of fins 188 arranged between the rollers 182. The fins 188 may be substantially plate-like elements arranged in planes parallel to the roller planes and the axis shaft 184 may pass through perforations in each of the fins 188. Bushings or other spacers may be provided along the shaft 184 to maintain the spacing of the rollers 182 and the fins 188 along the axis shaft 184 and key washers corresponding to circumferential keyways on the axis shaft 184 may also be provided for maintaining the location of the rollers 182 and fins 188 along the axis shaft 184.

The fins 188 may be configured for supporting the rollers 182 in addition to providing a guide surface for the converted dunnage after it passes between the drum 174 and the rollers 182. As shown best in FIG. 21, the fins 188 may have an arcuate edge 190 facing the drum 174 that is offset from the surface of the drum 174 near the contact point of the drum 174 and the rollers 182. As the arcuate edge 190 continues downstream away from the contact point, the arcuate edge 190 may have a concave shape relative to the drum 174 while also diverging from the surface of the drum 174 and leading to a tail portion of the fin 188. The plurality of fins 188 having the arcuate edge 190 may provide an upper guide to the converted dunnage that directs the converted dunnage generally downward relative to the tangential direction between the drum 174 and the rollers 182 as the dunnage passes out of the converter 146. The fins 188 may include an opposite arcuate back edge leading from the tail of each fin 188 to a crown of each fin. The back edge may extend generally straight from the tail portion toward the rollers 182 in a direction tangential to, but offset from, the surface of the respective rollers 182 it supports. As the back edge approaches the rollers 182 it may follow an arcuate path offset from the roller surface to the crown of the fin 188. The arcuate edge 190 and the back edge may be connected by a leading edge and a trailing edge as shown.

The fins 188 of the pressing portion 172 may be connected to one another and held in spaced apart relationship by a tail shaft 192 extending through respective tail portions of the fins 188. Bushings, key washers, or other space controlling elements may be positioned along the tail shaft 192 to maintain the spacing and location of the fins 188 relative to one another. The fins 188 may also be connected to one another, held in spaced apart relationship, and further supported by a supporting shaft 194. The supporting shaft 194 may pass through the crown portions of the fins 188 above the rollers 182. Bushings, key washers, or other space controlling elements may be positioned along the support shaft 194 to maintain the spacing and location of the fins 188 relative to one another. The support shaft 194 may extend beyond the inner most fin 188 (i.e., the fin 188 closest to the housing) to the housing 160 to support the pressing portion 172 of the converter 146 and define a pivot axis for the pressing portion 172. The support shaft 194 may be rigidly connected to the housing 160 to extend therefrom and maintain the support shaft 194 in parallel position to the drive shaft 186 of the drum 174. It is noted, with reference particularly to FIG. 21, that the relationship between the drum drive shaft or rotational axis 186, the axis shaft 184 of the rollers 182, and the support shaft 194 of the fins 188 is such that, as viewed in FIG. 21, counterclockwise rotation of the pressing portion 172 about the support shaft 194 allows the rollers 182 to freely separate from the drum 174 without binding. That is, as shown, the axis shaft 184 of the rollers 182 is positioned slightly to the right of an imaginary line connecting the support shaft 194 to the drive shaft 186. Were the axis shaft 184 positioned slightly to the left of the imaginary line with the rollers 182 and drum 174 in tangential contact, counterclockwise rotation of the pressing portion 172 may be prevented by contact between the rollers 182 and the drum 174.

As described, and ignoring the gravitational force, the pressing portion 172 may be substantially free to pivot in a direction tending to separate the rollers 182 from the drum 174 about the pivot point defined by the longitudinal axis of the support shaft 194. The fins 188 may be fixedly secured to the shaft 194 and the shaft 194 may be pivotable relative to the housing 160 or the shaft 194 may be fixed relative to the housing 160 and the fins 188 may be supported on the shaft 194 with bearings allowing the fins 188 to pivot about the pivot point. To resist this substantially free rotation, the pressing portion 172 may be secured in position by a position control system configured to maintain the rollers 182 in tangential contact with the drum 174, unless or until a sufficient separation force is applied, and hold the rollers 182 in a released position, once released. As such, when the dunnage passes between the drum 174 and the roller 182, the position control system may resist separation between the pressing portion 172 and the drum 174 thereby pressing the coiled stream of sheet material and converting it into a pressed coil of dunnage. When the rollers 182 are released due to a jam or other release causing force, the position control system may hold the rollers 182 in a released position allowing the jam to be cleared and preventing damage to the machine, jammed material, or human extremities, for example. The position control system may include one or more biasing elements 196 arranged and configured to maintain the position of the pressing portion 172 relative to the housing 160 and the pulling portion 170 unless or until a separation force is applied. The position control system may also include a release hold element 198 configured to hold the pressing portion 172 in the released condition once the separation force has been applied and the pressing portion 172 has been released. In some embodiments the one or more biasing elements 196 may include a magnetic biasing element. In alternative embodiments a spring or other biasing type mechanism may be provided. The release hold element 198 may also be a magnetic holding element or another holding device such as a mechanical catch or other holding element may be provided.

As shown in FIG. 21, the inner most fin 188 may include one or more leading magnets and one or more trailing magnets. The magnets may have a polarity and a strength and may be arranged to interact with corresponding magnets on the housing 160. In the particular embodiments shown, the trailing magnets may form the biasing element 196 and may be configured to hold the pressing portion 172 in position against the drum 174 to create dunnage. The leading magnets in this embodiment may form the release hold element 198 and may be configured to hold the pressing portion 172 in a released condition once a separation force has been applied.

For purposes of further discussion, the biasing element 196 will be referred to as trailing magnet 196 and the hold element will be referred to as leading magnet 198. Regarding the trailing magnets 196, in the present embodiment, two magnets 196 are shown arranged on the tail of the inner most fin 188 of the pressing portion 172. The magnets 196 shown are arranged at separate radial distances from the pivot point of the pressing portion 172 defining an inner and outer magnet 196, with respect to the pivot point. The inner and outer magnets 196 may be arranged on separate radially extending lines for purposes of controlling the stroke provided when the magnets 196 are separated from corresponding magnets on the housing.

The magnetic attraction between the trailing magnets 196 and the housing 160 preferably resists separation forces applied to the pressing portion 172. The radial distance between the pivot point and the location of the magnet 196 may define a resistance moment arm. The magnetic force of the magnets 196 multiplied by the resistance moment arm may define the resistance moment. Where multiple magnets 196 are provided, the sum of the moment arms multiplied by their respective radial distances from the pivot point may define the resistance moment. Dividing the resistance moment by the distance between the pivot point and the roller axis shaft may define a release force. That is, where a release force is applied to the roller axis shaft 184, the component of the force directed perpendicular to the radial line connecting the pivot point to the roller axis shaft 184 may overcome the magnetic force of the magnets and the pressing portion 172 may be allowed to separate from the pulling portion 170. The resistance moment that may be overcome to release the rollers may range from approximately 10 in-lbs. of torque to approximately 70 in-lbs. In other embodiments, the resistance moment may range from approximately 20 in-lbs. to approximately 50 in-lbs. In other embodiments, the resistance moment may range from approximately 35 in-lbs. to approximately 40 in-lbs.

It is noted that the nature of the magnets may cause the release force to diminish as the pressing portion is separated due to the increasing distance between the magnets on the inner fin 188 and those on the housing 160. As such, the release or biasing force of the magnets may be substantially removed when the pressing portion 172 is pivoted to its released position. This can be advantageous because the pressing portion 172 may remain separated once released and may not produce increasing pinching forces as it separates like, for example, a spring may. As such, where a user's extremity, for example, is drawn into the converter 146, once the release force is reached, the pressing portion 172 may release and additional pinching at higher levels of force may be avoided.

Regarding the leading magnets 198, in the present embodiment, one magnet is shown and is positioned at a radial distance from the pivot point less than the radial distance used for the trailing magnets 196. The leading magnet 198 may be positioned near the leading bottom edge of the fin 188 and may be configured for attraction with a magnet on the housing 160 when the pressing portion 172 is pivoted about the pivot point. That is, as shown in FIG. 21, when the pressing portion 172 is pivoted counterclockwise about the pivot point, the leading magnet 198 may travel along an arc defined by its radial distance from the pivot point and may come into substantial alignment with a corresponding magnet on the housing 160 as shown. Accordingly, once the pressing portion 172 is released, the leading magnet 198 may function to hold the pressing portion 172 in the released condition. It is noted that the single magnet at the shorter radial distance from the pivot point may reduce the holding power of the leading magnet 198 relative to the trailing magnets 196 and thus placing the pressing portion 172 back into an engaged position may not take as much force as it does to release the pressing portion 172.

Figure 20:
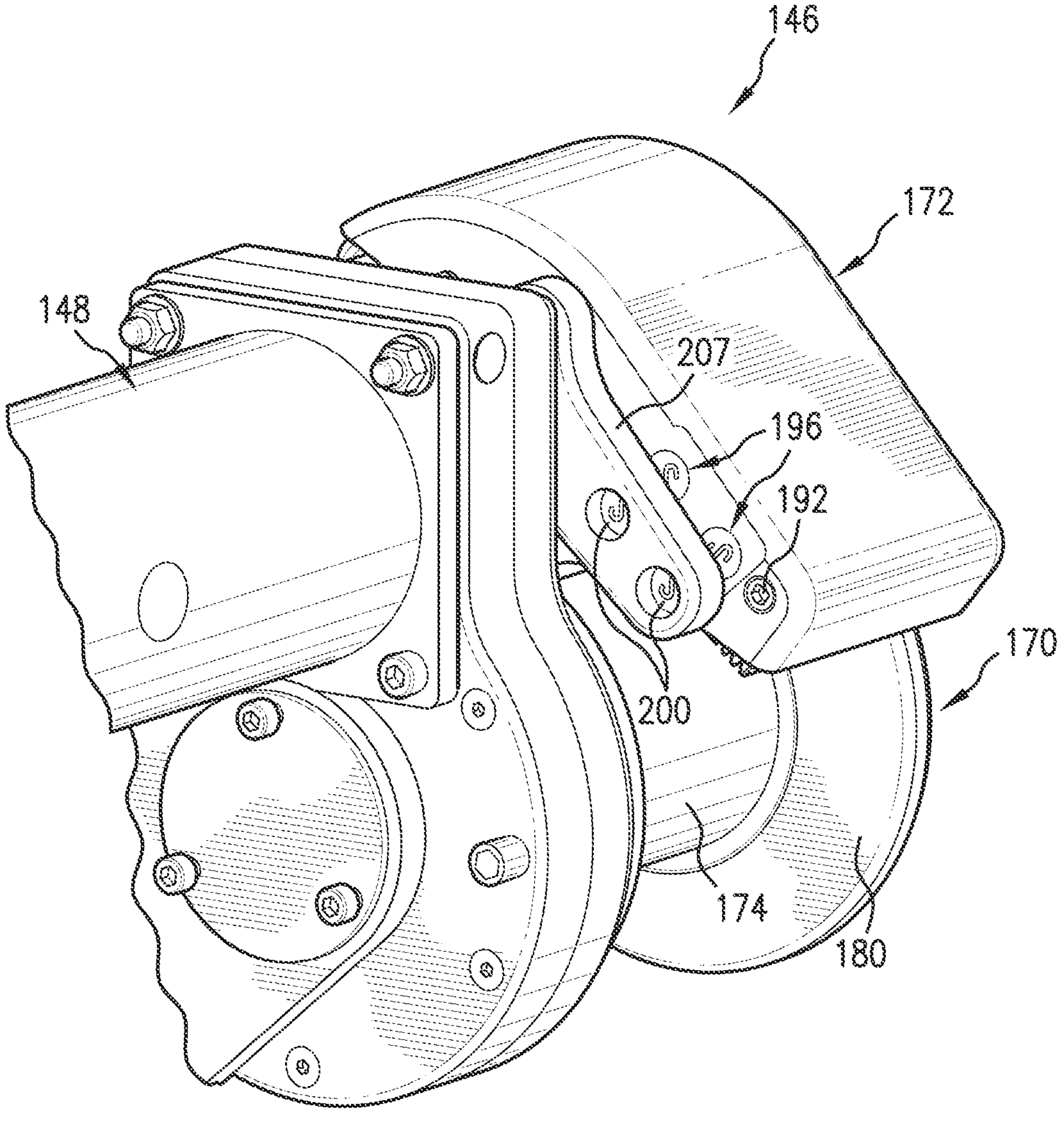
FIG. 20 is a cutaway, front left perspective view thereof.

The corresponding magnets on the housing 160 may be provided on a pivot control reference bar 204. As shown in FIGS. 20 and 21, the reference bar 204 may be fastened to the housing 160 via bolt or screw holes thereby fixing the position of the bar 204 relative to the housing 160. The bar 204 may include a pair of converting magnets 200 on a first end arranged to correspond with the trailing magnets 196 on the pressing portion 172. It is noted that, in the fully closed and engaged position of the pressing portion 172, where the rollers 182 are engaged with the drum 174, the trailing magnets 196 may be slightly offset counterclockwise from the converting magnets 200. As such, when not paper is positioned between the rollers 182 and the drum 174, an initial biasing force may be provided due to the trailing magnets 196 being biased toward alignment with the converting magnets 200. In some embodiments, the trailing magnets 196 may be offset from the converting magnets 200 by a center to center distance ranging from approximately 0.15 inches to approximately 0.55 inches. In other embodiments, the offset distance may range from approximately 0.25 inches to approximately 0.45 inches. In still other embodiments, the offset distance may be approximately 0.35 inches. The offset distance may be optimized to create the maximum resistance force for a given pair of magnets. That is, a bell curve of resistance force may exist as the magnets travel from an aligned condition to a distanced condition. That is, when aligned, the resistance to shearing motion may be minimal but may increase as the magnets are moved in a shearing motion until they get to a maximum force after which the resistance to shearing will decrease due to the increased distance between the magnets.

The pivot control reference bar 204 may also include a holding magnet 202 arranged near a second end to correspond with a released position of the leading magnet 198 on the pressing portion 172. As shown, the holding magnet 202 may be positioned along the arcuate travel path of the leading magnet 198 on the pressing portion 172 to allow the leading magnet 198 to align with the holding magnet 202 upon releasing motion of the pressing portion 172.

In alternative embodiments, the leading and trailing magnets 196, 198 may be arranged at the same or similar radial distance from the pivot point on the pressing portion 172. In this embodiment, when the resistance moment is overcome, the trailing magnet 196 may release from its magnetic attraction to a magnet on the housing 160 and the releasing motion of the pressing portion 172 may cause the leading magnet 198 to travel along an arc to a point where the trailing magnet 196 previously was positioned. As such, the leading magnet 198 may come into magnetic attraction with the magnet on the housing 160 previously associated with the trailing magnet 196 and function to hold the pressing portion 172 in the released position. In still other alternatives, a magnet may be positioned on the pressing portion 172 and may be associated with a first magnet or plurality of magnets on the housing 160 at a first location when the pressing portion 172 is in the engaged position. When the pressing portion 172 is moved to a released position, the magnet on the pressing portion 172 may come into magnetic association with a second magnet or plurality of magnets on the housing at a second location.

The magnets used herein may be neodymium (NdFeB), grade N42, disc type magnets. The disc magnets may be approximately ¾" thick with approximately a ½" diameter and may be triple plated with a Ni—Cu—Ni coating. The magnets may have a surface field of 4667 Gauss, a Brmax of 13,200 Gauss, and a BHmax of 42 MGOe. Other magnets with varying sizes and properties may be provided. Where other sizes and resulting magnetism are provided, the radial distances from the pivot point and the number of magnets used may be selected to provide suitable resistance moments and holding forces. The magnets may be force fit into openings in the housing and pressing portion and/or studded magnets may be provided having threaded shafts extending therefrom for threadingly engaging the pressing portion or housing. While two pairs or groups of magnets are described above, a different number or arrangement of magnets (or other magnetic members) can be used to select a desired hold-down force, and/or a different rate of change of hold down force as the pressing portion 172 is opened. In one embodiment, four pairs of magnets are used.

Figure 22:
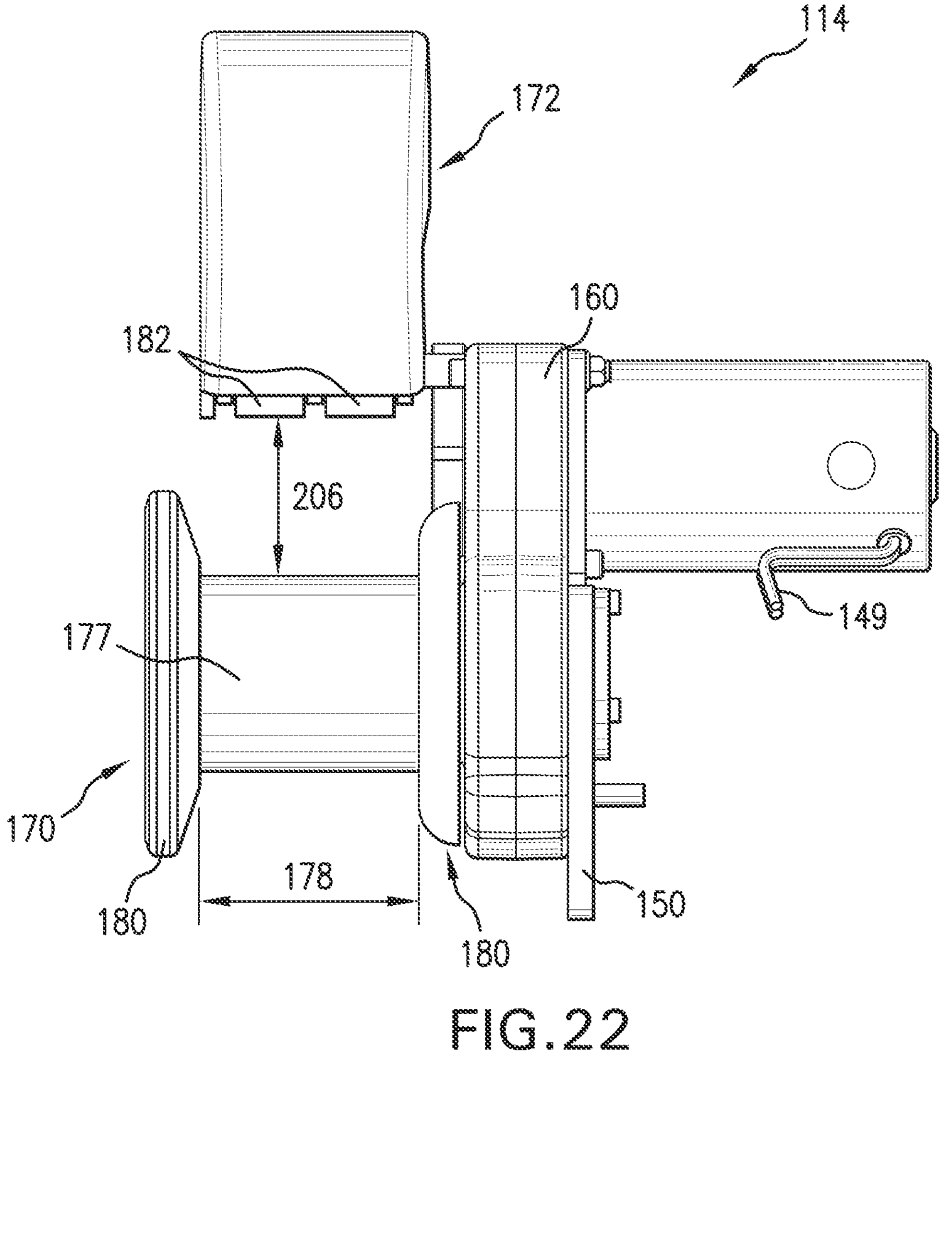
FIG. 22 is a rear view of the converter of FIG. 18 in a release position.

Referring now to FIG. 22, the clearances between the pressing portion 172 and the pulling portion 170 in the released condition may approximate those of a human hand and/or forearm. As such, were a user to get their hand or arm caught in the machine, the resistance force may be overcome releasing the pressing portion 172 and allowing clearances to develop between the pressing portion 172 and the pulling portion 170 to avoid harming the users extremities. The clearance 206 provided between the rollers 182 and the drum 174 in the released position may be approximately 1" to approximately 4". In other embodiments, the clearance 206 may be approximately 2½". Other clearance 206 dimensions may be provided.

As an additional safety feature, a shutoff switch may be provided that is triggered by the release of the pressing portion 172 such that while clearances are provided, the drum 174 may also be stopped from rotating. The shutoff switch may be in the form of a mechanical trip switch, an electrical contact, an optical eye, or other sensory device that opens or closes an circuit when the pressing portion 172 is released. It is also noted that, for example, where a roll 120 of sheet material is provided with a closing sticker on its outside end, a user may place the roll on a roll support 113 and may not remove the closing sticker. When the roll 120 is exhausted by drawing into and through the converting station 114, the final loop of sheet material created by the closing sticker may be drawn through the machine. This relatively large bunch of paper may be sufficient to develop the release force thereby tripping the shutoff switch and allowing the machine to be automatically shutoff when the sheet material has been exhausted.

As described, the converting portion 114 including the pulling portion 170 and pressing portion 172 may be supported by the support portion 142 of the converting station 114. The orientation of the housing 160 and the pressing portion 172 may be adjustable around the periphery of the pulling portion 172 by use of the quick-release lever. That is, the axis of rotation of the housing 160 may coincide with the drive shaft 186 of the drum 174. As such, adjustment of the housing 160 and the supported pressing portion 172 about the axis of rotation of the housing 160 may cause the pressing portion 172 to track along the surface of the drum 174. Accordingly, the infeed angle and, consequently, the outfeed angle may be adjusted to suitably accommodate the position of the intake guide coil 152 and the parting device 118. In some embodiments, the support portion 142 of the converting station 114 may have a height adjustment such as telescoping tubes with spring pins to allow the height of the converting station 114 to be adjusted relative to a respective supply station 112 and parting device 118.

As shown in FIGS. 20 and 21, the fins 188 described above may include trailing teeth 208 positioned near the tail of the fins 188 on the arcuate edge 190 facing the drum 174. These teeth may assist a user with parting the stream of dunnage by grasping a leading portion of the stream of dunnage and lifting the stream to cause an upstream portion of the stream to engage the teeth 208 on the fins. The leading portion of the dunnage may then be pulled to tear the leading portion free from the stream of dunnage and/or a portion of the dunnage just downstream of the teeth 208 may be grasped and pulled to the side thereby tearing the leading portion free. In this embodiment, the resistance moment described above may be higher than the upward force applied to the tails of the fins 188 during tearing multiplied by the distance from the support shaft 194. In this manner, releasing the pressing portion 172 during tearing or parting of the dunnage may be prevented. In other embodiments, stoppage of the machine may be desired upon tearing a piece of dunnage free. In these embodiments, lifting a leading portion of the dunnage may overcome the resistance moment thereby lifting the pressing portion 172 to a released position. A catch may be provided to prevent over rotation of the pressing portion 172 in the release direction and the dunnage may be torn across the teeth 208 once the pressing portion 172 abuts the catch, for example. In other embodiments, the teeth 208 may be omitted.

Figure 23:
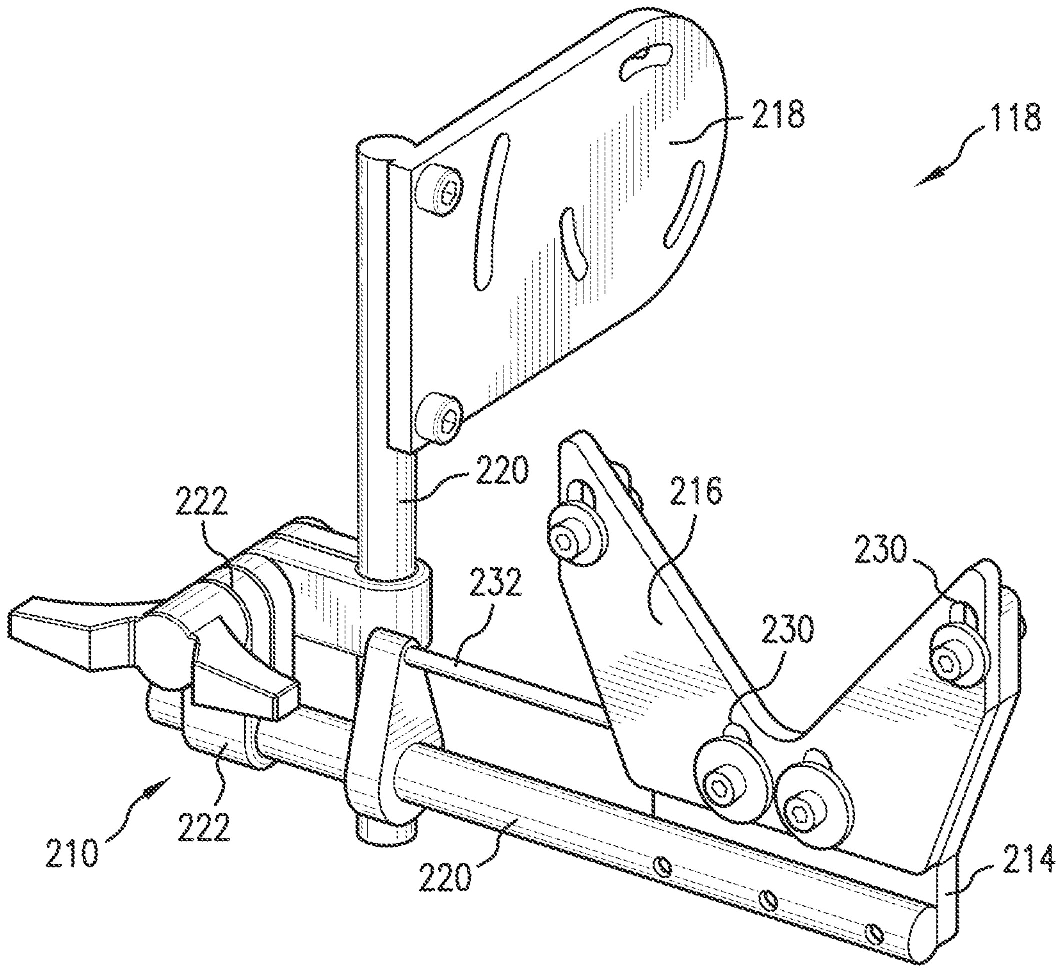
FIG. 23 is a perspective view of a parting device of the system of FIG. 7.
Figure 24:
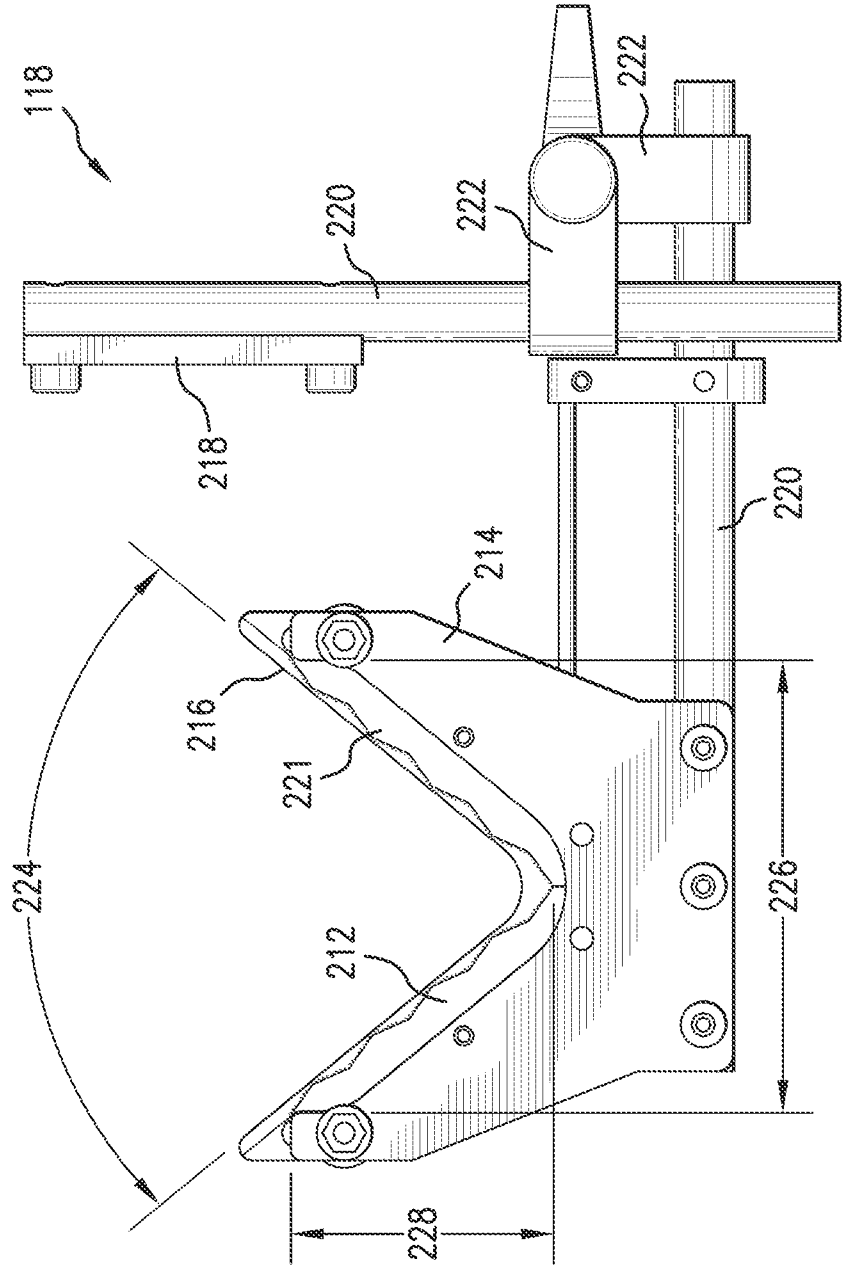
FIG. 24 is a rear view thereof.
Figure 25:
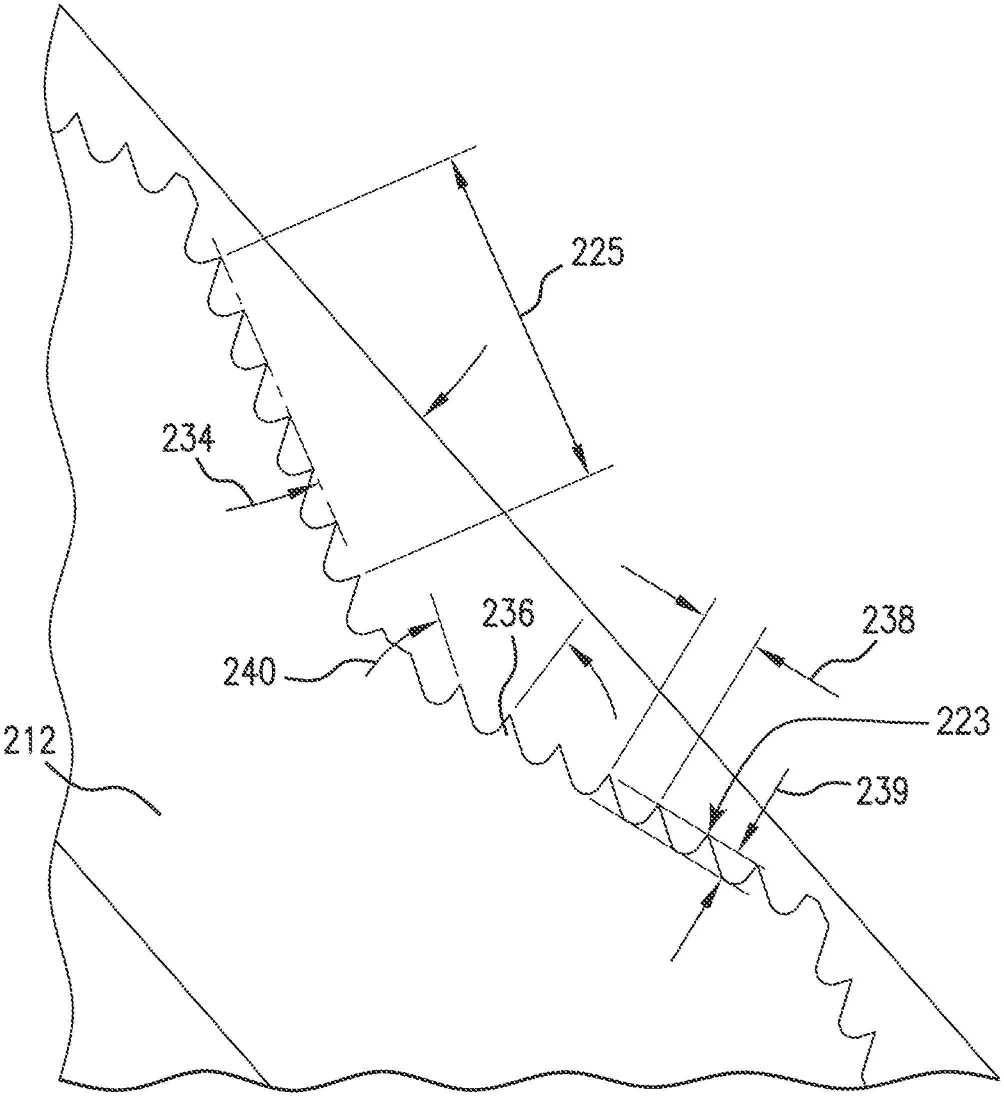
FIG. 25 is a close-up, rear view of a blade of the parting device of FIG. 23.

Referring now to FIGS. 23-25, a parting device 118 may be provided. The parting device 118 may include a positioning portion 210 for positioning the parting device 118 relative to the converting station 114. The parting device 118 may also include a separator 212 for separating the dunnage and a mount 214 for positioning of the separator thereon. The parting device 118 may also include a guard 216 for protecting against inadvertent or glancing contact with the separator 212.

The positioning portion 210 of the parting device may be in the form of a linkage supporting the separator 212 from the converting station 114. In alternative embodiments, the positioning portion 210 may be an isolated support structure for locating the separator 212 at or near the converting station 114. As shown, the linkage may include an attachment bracket 218 for attachment to the housing 160 of the converting station 114 and may include arcuate slotted holes for pivoting adjustability of the parting device 118. The linkage may also include a pair of linkage bars 220. A first linkage bar 220 may extend from the attachment bracket 218 and be fixedly secured thereto. The second linkage bar 220 may be pivotably and slidably secured to the first linkage bar 220 allowing the second linkage bar 220 to be translated toward and away from the converting station 114 as well as laterally relative to the first linkage bar 220. The connection between the first and second linkage bars 220 may also allow the second linkage bar 220 to be rotated about the first linkage bar 220 and pivoted relative thereto. As such, the motion of the second linkage bar 220 relative to the first linkage bar 220 may include four degrees of freedom. This level of motion may be provided by a pair of pipe clamps 222 each positioned around respective linkage bars 220 and secured with a threaded shaft having a wing-nut like knob for tightening and loosening the same.

As best shown in FIG. 24, a mount 220 may be fixedly secured to the second linkage bar 220 with a plurality of fasteners. The mount 220 may alternatively be secured by welding or otherwise connecting. The mount 214 may include a generally V-shaped edge configured to receive a stream of dunnage.

A separator 212 in the form of a cutter including a cutting blade may be secured to the mount 214 as shown in FIG. 24. The cutting blade may be a stationary cutting blade and may be secured to the mount 214 to expose a cutting edge along the V-shaped edge of the mount 214. The cutting blade may include one or more blades arranged to form a V-shape offset inwardly from the V-shaped edge of the mount 214. The V-shaped blade arrangement may form a V defining an angle 224 ranging from approximately 60° to approximately 100°. In other embodiments, the angle 224 may range from approximately 70° to approximately 90°. In still other embodiments, the angle 224 may be approximately 80°. The blade edge may be directed inward or outward and as such, the cutting blade may be concave as shown, or a convex blade may be provided. The outer tips of the V-shaped blade arrangement may define a cutting width 226 ranging from approximately 2 inches to approximately 6 inches. In other embodiments, the cutting width 226 may range from approximately 3 inches to approximately 5 inches. In still other embodiments, the cutting width 226 may be approximately 4 inches. The depth 228 of the V-shaped blade arrangement may range from approximately 1 inch to approximately 4 inches or from approximately 1½ inches to approximately 3 inches. In still other embodiments, the cutting depth 228 may be approximately 2¼ inches. Still other cutting widths, depths, and defining angles may be provided including those outside the ranges provided.

Referring again to FIG. 23, a guard 216 may be provided and may be secured to the mount 214 with fasteners. The guard 216 may include slotted holes 230 allowing the guard 216 to translate along the fasteners relative to the blade and the mount 214. The guard 216 may be have a substantially V-shaped edge corresponding to the V-shaped blade arrangement. As shown, the guard 216 may be arranged in a first position and may be translatable via the slotted holes 230 to a second position. In the first position, the V-shaped edge of the guard 216 may align with or be slightly above the cutting edge of the blade. In the second position, the V-shaped edge of the guard 216 may be slightly below the cutting edge of the blade.

A biasing device 232 may be provided to bias the guard 216 toward the first protective position to avoid inadvertent contact with the blade. The biasing device 232 may be further configured for retracting to the second position when pressed upon by a stream of dunnage. The biasing device 232 may include a standoff device positioned on the second linkage bar 220 and a deflecting rod extending therefrom and connected to the guard 216. The deflecting rod may extend from the standoff device and may be configured to deflect via bending thereof when a retraction force is applied on the guard 216. When the retraction force is removed, the deflection rod may return the guard 216 to its first protective position.

Referring now to FIG. 25, a close-up view of the cutting edge of the cutting blade is shown. The cutting edge of the cutting blade may include two phases of serrations for cutting the stream of dunnage. As shown, a large phase of serration 221 may be visible from, for example, review of FIG. 24. This large phase 221 may define serration teeth considerably larger than the small phase 223 of serrations shown in FIG. 25. The embodiment shown in FIG. 25 has small teeth of the small phase 223 forming small serrations extending along the edges of the large teeth, which form large serrations on the large phase 221. For example, in some embodiments, a sloping edge of a large phase serration 221 may have a length 225 ranging from approximately ⅛ inch long to approximately/inch long. In other embodiments, a sloping edge of a large phase serration 221 may be approximately ¼ inch long. The slope 234 of the large phase edge may range from approximately 10° to approximately 30° or from approximately 15° to approximately 22.5°. In other embodiments, the slope 234 may be approximately 17.5°. Alternating sloping edges may form a series of large phase serrations 221.

The small phase serrations 223 may include teeth or serrations that are considerably smaller than the large phase serrations 221 and may be positioned along the sloping edges of the large phase serrations 221 allowing the small and large phase serrations to be coextensive along the edge of the blade. The small phase serrations 223, as shown in FIG. 25 may include teeth 236 having a length 238 ranging from approximately 1/64 of an inch to approximately 1/16 of an inch or the teeth 236 may be approximately 1/32 of an inch long. The teeth 236 may be approximately ½ as high 239 as they are long. Accordingly, in some embodiments, 4-8 small phase serration teeth 236 may be provided along a given sloping edge of a large phase serration 221. In one embodiment, the teeth 236 may have a considerably steeper slope than the large phase serrations 221 and may have an upward leaning slope 240 of approximately 55° relative to the slope 234 of the large serration 221, while trailing slope may be approximately 90° relative to the slope 234 of the large serration 221, although other suitable serration configurations can be used.

The large and small phase serrations 221, 223 may work together to part the dunnage. That is, a user may grasp a free end of the stream of dunnage and direct an upstream portion into the parting device 118. Where a simple V-shaped blade may cause the stream of dunnage to bunch toward a side of a given blade and thus in the base of the V and cause difficulty in cutting due to the increased thickness of dunnage, the large phase serrations 221 may act like a plurality of cascading shelves keeping the dunnage from bunching toward the side of each blade and in the bottom of the V. The small phase serrations 223 may then bite into and tear through the portion of dunnage being held on their respective large phase serrations.

One having ordinary skill in the art should appreciate that there are numerous types and sizes of dunnage for which there can be a need or desire to accumulate or discharge according to an exemplary embodiment of the present invention. As used herein, the terms "top," "bottom," and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. The converter having a drum, for example, can be replaced with other types of converters and can convert feed stock other than coiled strips from supply rolls. Therefore, it will be understood that the appended claims are intended to cover all such modifications and embodiments that come within the spirit and scope of the present invention.

What is claimed is:

1. A method of converting dunnage, comprising:

pulling a stream of continuous sheet material between first and second crumpling portions that are biased against each other in an engaged position to crumple the sheet material into crumpled dunnage;

moving the first crumpling portion from the engaged position to a released position to release the sheet material from between the first and second crumpling portions;

magnetically holding the first crumpling portion in the released position using a release-hold magnet; and removing the sheet material from between the first and second crumpling portions while the first crumpling portion is magnetically retained in the released position.

2. The method of claim 1, wherein pulling the sheet material into dunnage material comprises pressing and rotating the second crumpling portion to advance the sheet material engaged between the first and second crumpling portions.

3. The method of claim 1, wherein the first crumpling portion is a pressing member, and the second crumpling portion is a drum.

4. The method of claim 1, wherein biasing the first and second crumpling portions against each other comprises magnetically biasing the first crumpling portion toward the second crumpling portion using a biasing magnet.

5. The method of claim 4, wherein moving the first crumpling portion to the released position comprises overcoming a release force caused by the bias of the biasing magnet that is sufficiently weak such that an accumulation of material between the first and second crumpling portions overcomes the release force.

6. The method of claim 5, wherein the release force is within a range of 10 in-lbs. to 70 in-lbs.

7. The method of claim 1, further comprising maintaining the first crumpling portion in the released position upon removal of the sheet material by magnetically holding the first crumpling portion in the released position via the release-hold magnet.

8. The method of claim 1, wherein the first crumpling portion is supported by a support arm that carries the release-hold magnet and moving the first crumpling portion to the released position comprises pivoting the support arm.

9. The method of claim 8, wherein the support arm is associated with a biasing magnet that biases the first and second crumpling portions against one another until a release force moves the first crumpling portion to the released position.

10. A method of converting dunnage, comprising:

pulling a stream of continuous sheet material between a pressing member and a drum that are biased against one another in an engaged position to crumple the sheet material into crumpled dunnage;

moving the pressing member to from the engaged position a released position to release the sheet material from between the pressing member and the drum;

magnetically holding the pressing member in the released position using a release-hold magnet; and removing the sheet material from between the pressing member and the drum while the pressing member is magnetically retained in the released position.

11. The method of claim 10, wherein pulling the sheet material into dunnage material comprises pressing and rotating the drum to advance the sheet material engaged between the pressing member and the drum.

12. The method of claim 10, biasing the pressing member against the drum comprises magnetically biasing the pressing member toward the drum using a biasing magnet.

13. The method of claim 12, wherein moving the pressing member to the released position comprises overcoming a release force caused by the bias of the biasing magnet, the release force being sufficiently weak such that an accumulation of material between the drum and the pressing member overcomes the release force.

14. The method of claim 10, further comprising maintaining the pressing member in the released position upon removal of the sheet material by magnetically holding the pressing member in the released position via the release-hold magnet.

* * * * *